US012608382B2

(12) United States Patent
Leith

(10) Patent No.: US 12,608,382 B2
(45) Date of Patent: \*Apr. 21, 2026

(54) PROPERTY RESOURCE LOCATION AND INFORMATION SHARING SYSTEM

(71) Applicant: Chasing Bacon, LLC, Oak Harbor, WA (US)

(72) Inventor: Andrew Leith, Oak Harbor, WA (US)

(73) Assignee: Chasing Bacon, LLC, Oak Harbor, WA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 18/635,918

(22) Filed: Apr. 15, 2024

(65) Prior Publication Data

US 2024/0330307 A1     Oct. 3, 2024

Related U.S. Application Data

(63) Continuation of application No. 17/516,397, filed on Nov. 1, 2021, now Pat. No. 11,960,490.

(51) Int. Cl.
*G06F 16/00*        (2019.01)
*G06F 3/0482*       (2013.01)
(Continued)

(52) U.S. Cl.
CPC ...... *G06F 16/24573* (2019.01); *G06F 3/0482* (2013.01); *G06F 16/29* (2019.01)

(58) Field of Classification Search
CPC .. G06F 16/24573; G06F 3/0482; G06F 16/29; G06Q 30/015; G06Q 50/265;
(Continued)

(56) References Cited

U.S. PATENT DOCUMENTS 9,213,461 B2 \* 12/2015 Eraker ................. G06F 3/0481
9,706,011 B2    7/2017 Smedberg et al.
(Continued)

OTHER PUBLICATIONS

You et al., "Image-Based Appraisal of Real Estate Properties," IEEE Transactions On Multimedia, vol. 19, No. 12, Dec. 2017, pp. 2751-2759 (Year: 2017).\*
(Continued)

*Primary Examiner* — Cheryl Lewis
(74) *Attorney, Agent, or Firm* — Craig R. Miles; CR MILES P.C.

(57) ABSTRACT

In general, a computer implemented system configured to receive and retrievably share property metadata associated with an identified property or resource metadata associated with an identified resource with a user or a user group. Specifically, a program code accessible by one or more computing devices to depict a user interface configured to allow entry of property metadata associated with a property identifier of a property and entry of resource metadata associated with a resource identifier of a resource associated with the property allowing a user or each of a group of users to expediently retrieve property metadata or resource metadata associated with a property including metadata associated with one or more default resources associated with a property including: a water shut off valve, a gas shut off valve, and a circuit breaker box.

22 Claims, 24 Drawing Sheets

(51) Int. Cl.
　　*G06F 16/2457*　　(2019.01)
　　*G06F 16/29*　　(2019.01)
(58) Field of Classification Search
　　CPC ........ G06Q 10/10; G06Q 30/06; G06Q 50/06;
　　　　　　　　　　　　　　　　　　G06Q 50/00
　　See application file for complete search history.

(56)　　　　　　　　References Cited

U.S. PATENT DOCUMENTS

| | | |
|---|---|---|
| 10,078,866 B1 | 9/2018 | Eraker et al. |
| 2013/0254670 A1* | 9/2013 | Eraker .................. G06Q 50/16 |
| | | 715/738 |
| 2014/0236768 A1* | 8/2014 | Aickin ................ G06F 16/9537 |
| | | 705/26.61 |
| 2015/0193892 A1 | 7/2015 | Bond |
| 2016/0117776 A1 | 4/2016 | Maher |
| 2019/0228484 A1 | 7/2019 | Sheppard et al. |
| 2023/0035517 A1* | 2/2023 | Bentley, III ....... G06Q 30/0206 |

OTHER PUBLICATIONS

PCT International Patent Application No. PCT/US22/40699, International Search Report and Written Opinion of the International Searching Authority dated Dec. 23, 2022, 8 pages.
U.S. Appl. No. 17/516,397, Office Action mailed Aug. 1, 2023.
Corresponding Mexican Patent Application No. MX/a/2024/005400, Office Action dated Nov. 28, 2024, 6 pages.

\* cited by examiner

FIG. 13

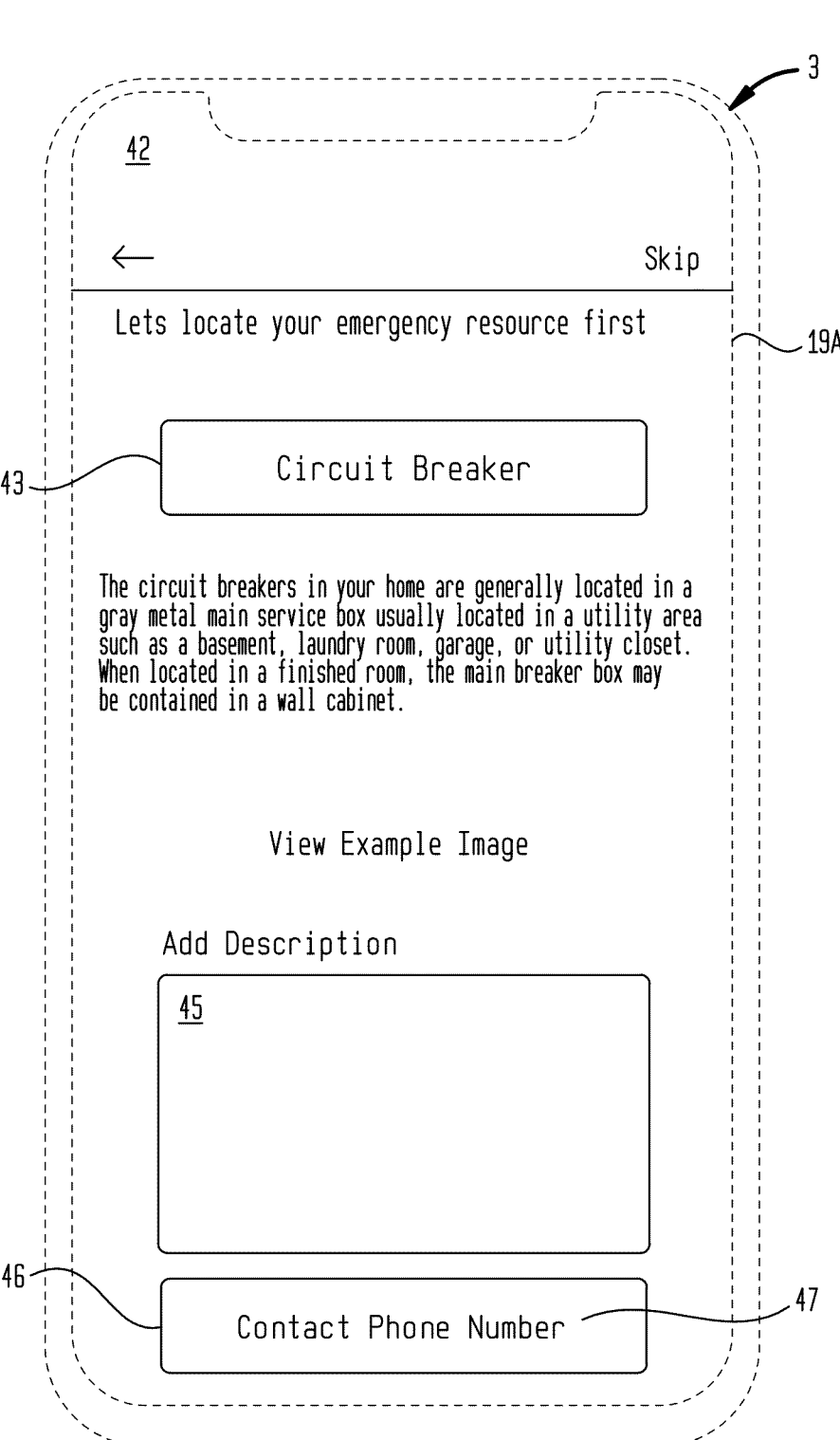

42

←                                         Skip

Lets locate your emergency resource first

Circuit Breaker

The circuit breakers in your home are generally located in a gray metal main service box usually located in a utility area such as a basement, laundry room, garage, or utility closet. When located in a finished room, the main breaker box may be contained in a wall cabinet.

View Example Image

Add Description

45

Contact Phone Number

PROPERTY RESOURCE LOCATION AND INFORMATION SHARING SYSTEM

I. FIELD OF THE INVENTION

In general, a computer implemented system configured to receive and retrievably share property metadata associated with an identified property or resource metadata associated with an identified resource with a user or a user group. Specifically, a program code accessible by one or more computing devices to depict a user interface configured to allow entry of property metadata associated with a property identifier of a property and entry of resource metadata associated with a resource identifier of a resource associated with the property allowing a user or each of a group of users to expediently retrieve property metadata or resource metadata associated with a property including metadata associated with one or more default resources associated with a property including: a water shut off valve, a gas shut off valve, and a circuit breaker box.

II. SUMMARY OF THE INVENTION

Accordingly, a broad object of embodiments of the invention can be to provide one or more of: a computing device including a non-transitory computer readable medium containing a program code executable to depict a user interface on a display surface of the computing device which can receive by user indications a property identifier of a property and depict a geographic representation in which a property location can be identified and associated with property metadata and which can receive by user indications a resource identifier of a resource having a resource location on or about the property location and associated with resource metadata, whereby the property metadata and the resource metadate can be shared by a user or a user group to expedite subsequent location and identification of the property or the resources associated with the property.

Naturally, further objects of the invention are disclosed throughout other areas of the specification, drawings, photographs, and claims.

III. BRIEF DESCRIPTION OF THE DRAWINGS

FIG. 13 illustrates a user interface depicting an embodiment of a default property resource entry menu to enter resource metadata pertaining to circuit breaker box.

IV. DETAILED DESCRIPTION OF THE INVENTION

Figure 1:
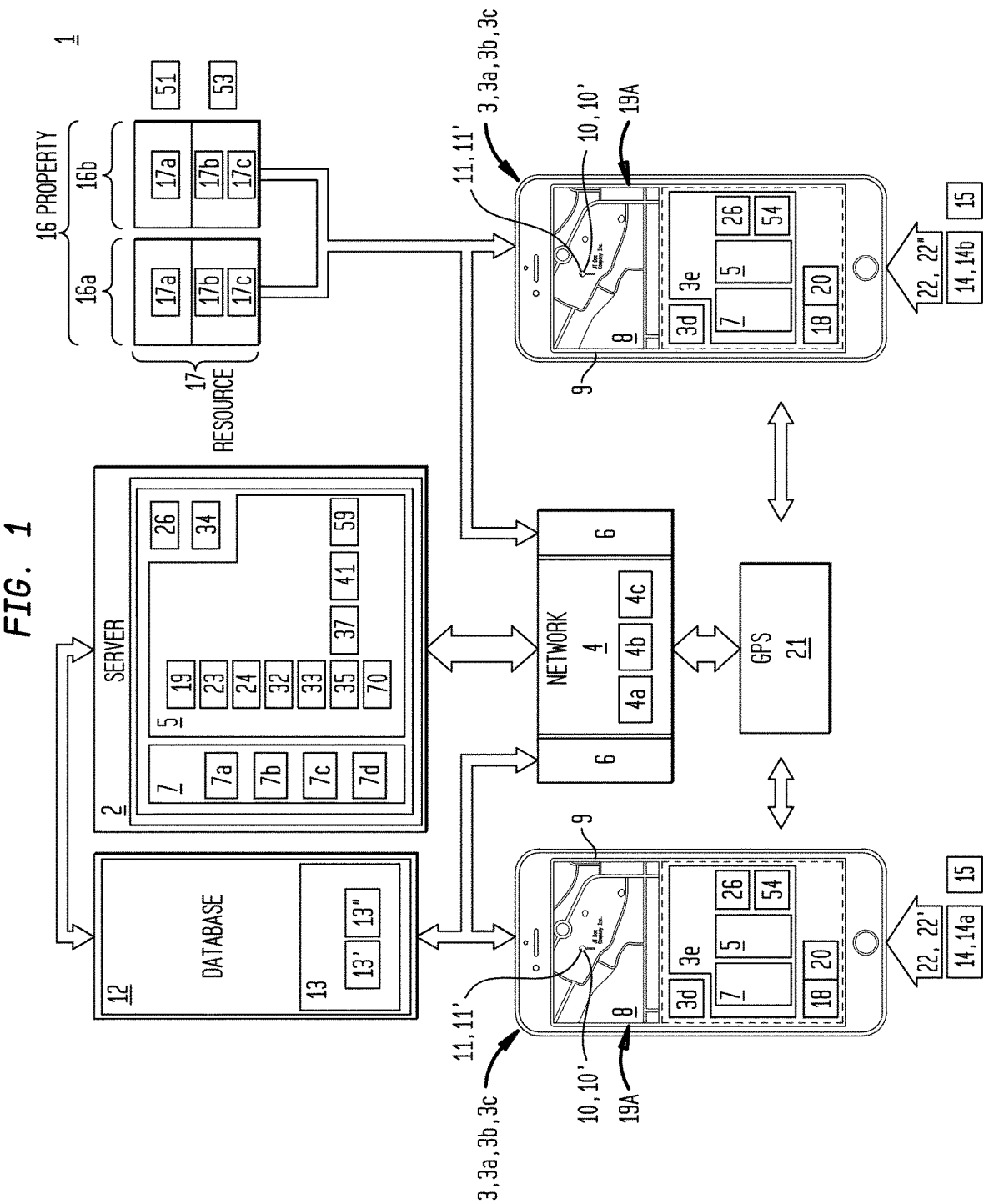
FIG. 1 is a block diagram of illustrative computer means, network means and computer-readable media which contains computer-executable instructions to implement an embodiment of property and property resource metadata sharing system.

The System. Generally, with reference to FIGS. 1 through 25, a property resource location and information sharing system (1) (also referred to as the "system (1)") can be distributed on one or more servers (2). The one or more servers (2) can comprise cloud computing allowing on-demand availability of data storage and computing power. As an illustrative example, Amazon Elastic Compute Cloud (Amazon EC2) provides scalable computing capacity in the Amazon Web Services Cloud. The one or more servers (2) can be operably coupled to one or more computing devices (3) (3a, 3b . . . 3n) by a public network (4), such as the Internet (4a), a cellular-based wireless network(s) (4b), or a local network (4c) (individually or collectively the "network (4)"). The network (4) supports a property resource location and information sharing program (5) (also referred to as the "program (5)") including processor readable code accessible by browser based on-line processing or downloadable by one or more computing devices (3). The program (5) operates to coordinate communication between the one or more servers (2) and the one or more computing devices (3) to establish on-line or off-line wired or wireless connection to utilize and share system content (6).

Now, with primary reference to FIG. 1, in a particular embodiments, the system content (6) can include the content of one or more computer applications (7) (7a, 7b, . . . 7n). The one or more servers (2) by implementation of the program (5) can, as one example, access and retrieve data from a mapping and navigation application (7a), such as:

GOOGLE MAPS, MAPQUEST, PANORAMIO, to retrieve and display a geographic representation (8). The geographic representation (8) can be a map, such as: a geoplanar map, topographic map, road map, satellite map, or other representation of a geographic area that can be depicted on a display surface (9) of the one or more computing devices (3). In particular embodiments, the mapping and navigation application (7*a*) can place a property location icon (10) (also referred to as a placemark or tag) at a location (11) in the geographic representation (8).

In particular embodiments, system (1) can include one or more relational databases (12) from which the one or more servers (2) can retrieve data (13) as a part of the system content (7), with or without association of the data (13) with other computer applications (7) (7*a*, 7*b*, . . . 7*n*). In particular embodiments, the one or more relational databases (12) can contain data and metadata (collectively data (13)) relating to a user (14), a user group (15), a property (16), or a resource (17), and combinations thereof.

Data. The term "data (13)" for the purposes of this invention means computer data processed or stored by one or more servers (2), databases (12), or computing devices (3) and without sacrificing the breadth of the foregoing, data (13) in part includes: digitized text documents, a still or moving image, a video clip, an audio clip, location coordinates providing a unique identifier of a precise geographic location on the Earth, global positioning coordinates, and combinations thereof.

Computing Devices. Again, with primary reference to FIG. 1, the one or more computing devices (3) can include a processor (3*d*) communicatively coupled to a non-transitory computer readable media (3*c*) capable of containing computer executable instructions including in whole or in part the program (5) or one or more computer applications (7) to implement the functionalities of the computing device (3) in the system (1). Each of the one or more client devices (3) can include an Internet browser (18) such as GOOGLE CHROME, MOZILLA FIREFOX, or the like, which functions to download and render system content (6) formatted in "hypertext markup language" (HTML). In this environment, a server (2) might be programmed to implement the most significant portions of a user interface (19A). As to these embodiments, the program (5) implementing the user interface (19A) can be resident in the server (2) and the one or more computing devices (3) can use the browser (18) to display downloaded content (6) and to relay user inputs (22) back to the server (2). The server (2) would respond by formatting additional content (6) and downloading the content (6) to the one or more client devices (3). In other embodiments, the one or more servers (2) can be used primarily as sources of data (13) with primary responsibility for implementing the user interface (19A) being placed upon each of the one or more computing devices (3). As to these embodiments, each of the one or more computing devices (3) can run the program (5) or other software applications (7) implementing the user interface (19A), to retrieve data (13) from the one or more servers (2) or the one or mor databases (12). While illustrative examples in this description may attribute a certain type of data (13) to a certain server (2) or database (12) for clarity, it is to be understood that various types of data (13) may reside in one server (2) or database (12) or one type of data (13) can be distributed among a plurality of servers (2) or databases (12) and embodiments of the invention can utilize servers (2) or databases (12) to a lesser or greater extent depending upon the program (5) or software applications (7) utilized by a computing device (3). Each of the computing devices (3) can further include a global positioning receiver (20) operably coupled to a global positioning system ("GPS") (21). While the term "computing device" is utilized in association with certain embodiments, this is not intended to limit the scope of the invention to those particular embodiments, rather certain embodiments may generically include a first computing device (3*a*) or a second computing device (3*b*) or a plurality of computing devices (3*a*, 3*b*, 3*c*), each operably coupled as above described. The one or more computing devices (3) can as illustrative examples be: a desktop computer device or a mobile computer device, such as, personal computers, slate computers, tablet or pad computers, cellular telephones, personal digital assistants, smartphones, programmable consumer electronics, or combinations thereof.

User. The term "user (14)" for the purposes of this invention means any person or thing using a computing device (3) to access or utilize the functionalities of the program (5) or the system (1).

Property. The term "property (16)" for the purposes of this invention means a physical structure having a fixed or moving physical location, and without sacrificing the breadth of the foregoing, includes residential properties (16*a*) or commercial properties (16*b*). Illustrative examples of a residential properties (16*a*) include: a home, an apartment, a condominium, a recreation vehicle, a motorhome, a campervan, a coach, a fifth-wheel trailer, and a boat. Illustrative example of commercial properties (16*b*) include: a commercial building, a hotel, a mall, a medical center, a shopping center, and a retail store.

Resource. The term "resource (17)" for the purposes of this invention means a physical element associated with a property (16), and without sacrificing the breadth of the foregoing, includes a part, a component, an article, an item, or a thing in or associated with a property (16). Illustrative examples of resources (17) include: a water shut off valve (17*a*), a gas shut off valve (17*b*), a circuit breaker box (17*c*); however, these illustrative examples are not meant to preclude other physical elements associated with the property, including as examples: a sewer line access point, a heater, an air conditioner, a washer, a dryer, a firearm, an emergency medical kit, a drug cabinet, a safe, a lock box, and a thermostat.

The Program. Now, primary reference to FIGS. 1, in particular embodiments, the program (5) can include a user interface module (19) including instructions to implement and depict a graphical user interface (19A) on the display surface (9) of the computing device (3) which correspondingly allows a user (14) by user indications (22) in the graphical user interface (19) or in combination with other user interfaces to execute one or more functions of the program (5). User indications (22) in the graphical user interface (19), or in combination with other user interfaces, can execute one or more functions of the program (5). As illustrative examples, user indications (22) can include: selection of one or more control icon(s), entry of text into one or more fillable fields, voice command, keyboard stroke, mouse button point and click, touch on a touch screen, or otherwise, or combinations thereof (individually and collectively referred to as a "user indications"). The term "module" for the purposes of this invention means a component or part of the program (5) that contains one or more routines. One or more modules make up the program (5).

Menu Module. Now, with primary reference to FIG. 1, embodiments of the program (5) can include a menu module (23) which functions to depict a list of options or commands on the display surface (9) of the computing device (3). A menu may either be the entire graphical user interface (19), or only part of a more complex graphical user interface (19) and may include one menu images or a plurality of images in which user indications (22) can activate one or more functions of the program (5). In particular embodiments, the menu module (23) communicates with other modules of the program (5) to stepwise depict lists, options or commands to the user (14) based on prior user indications (22) in the graphical user interface (19) which delimit the breadth and scope of user access to the functionalities of the system (5).

Figure 2:
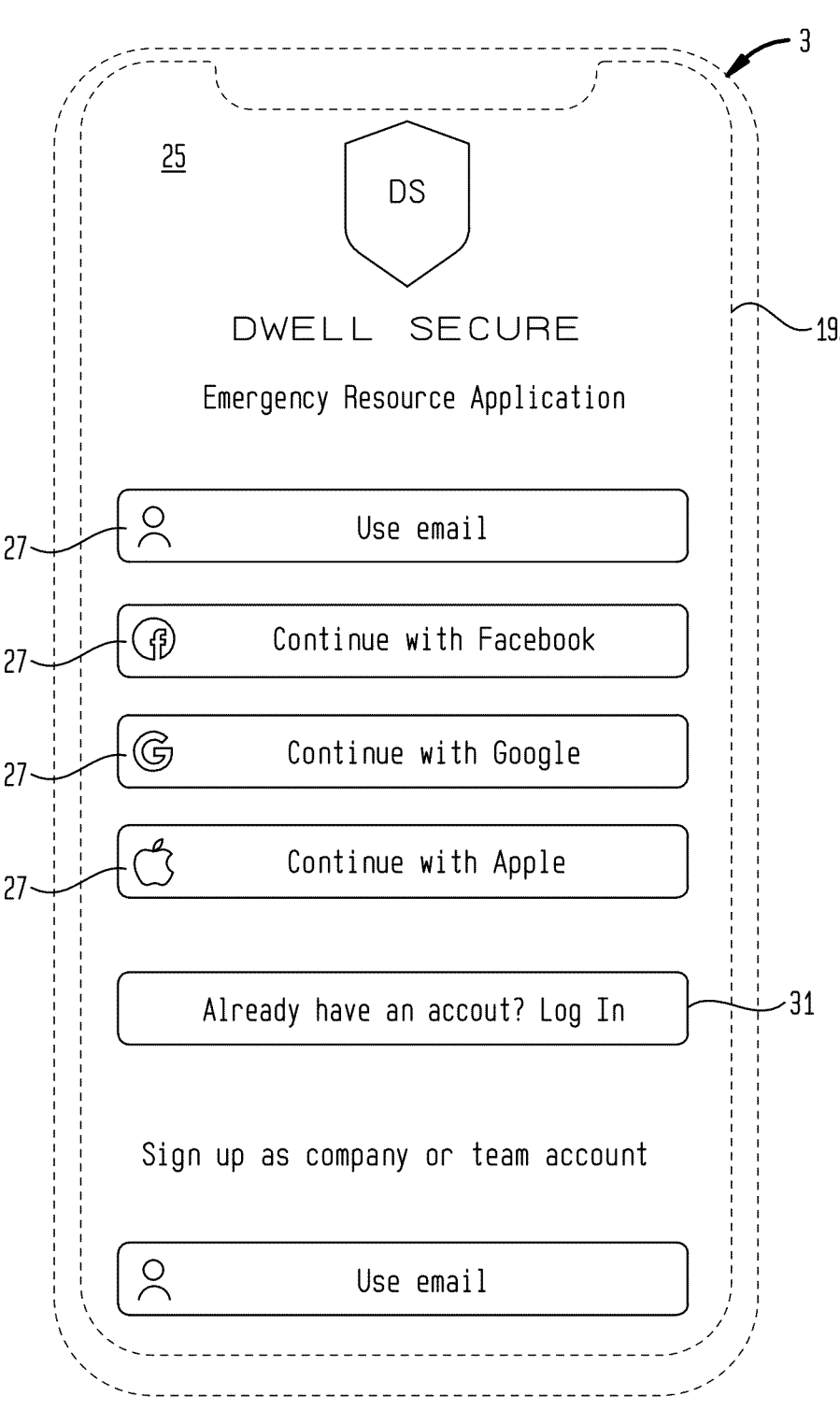
FIG. 2 illustrates a user interface depicting an embodiment of a program access menu.
Figure 3:
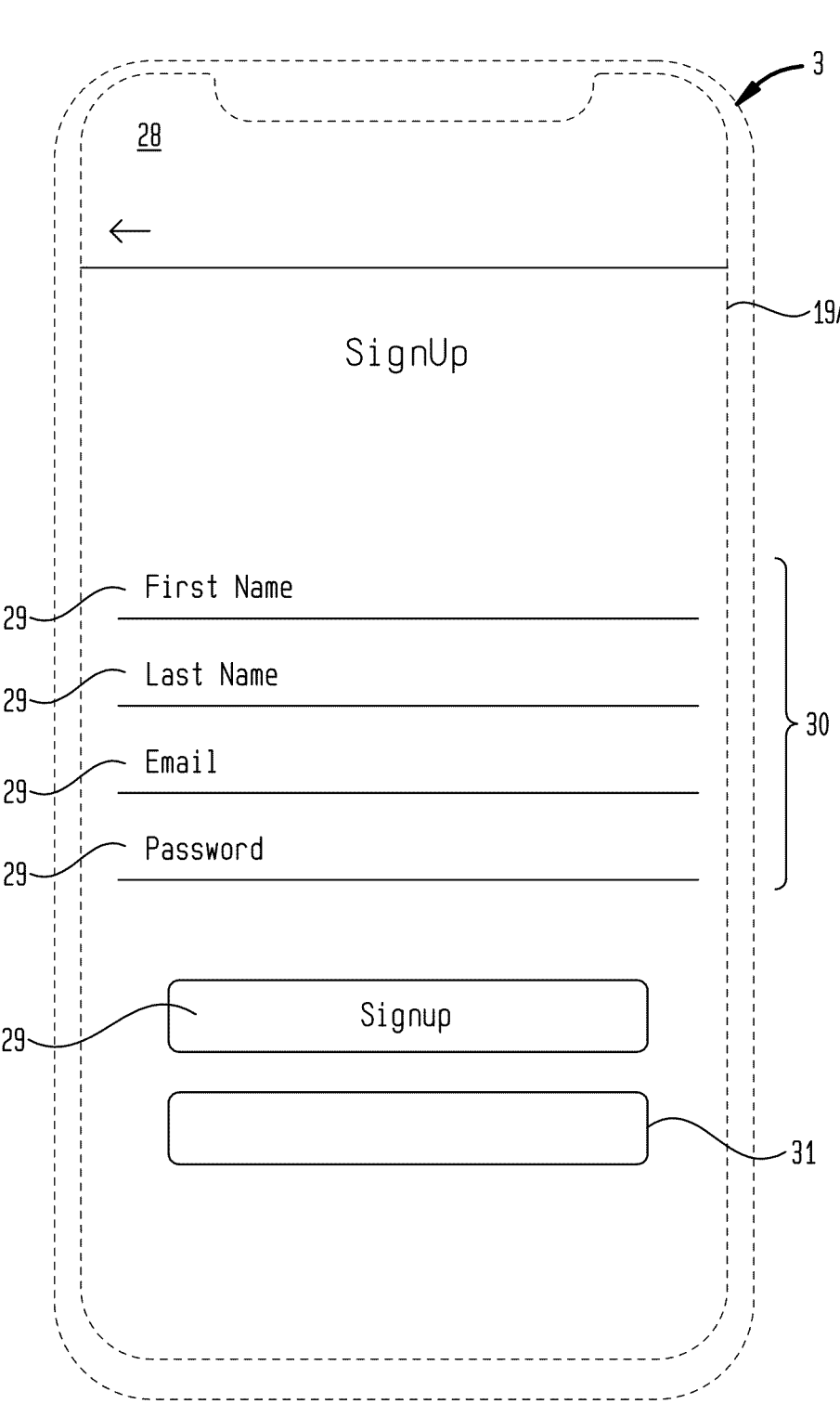
FIG. 3 illustrates a user interface depicting an embodiment of a signup menu.
Figure 4:
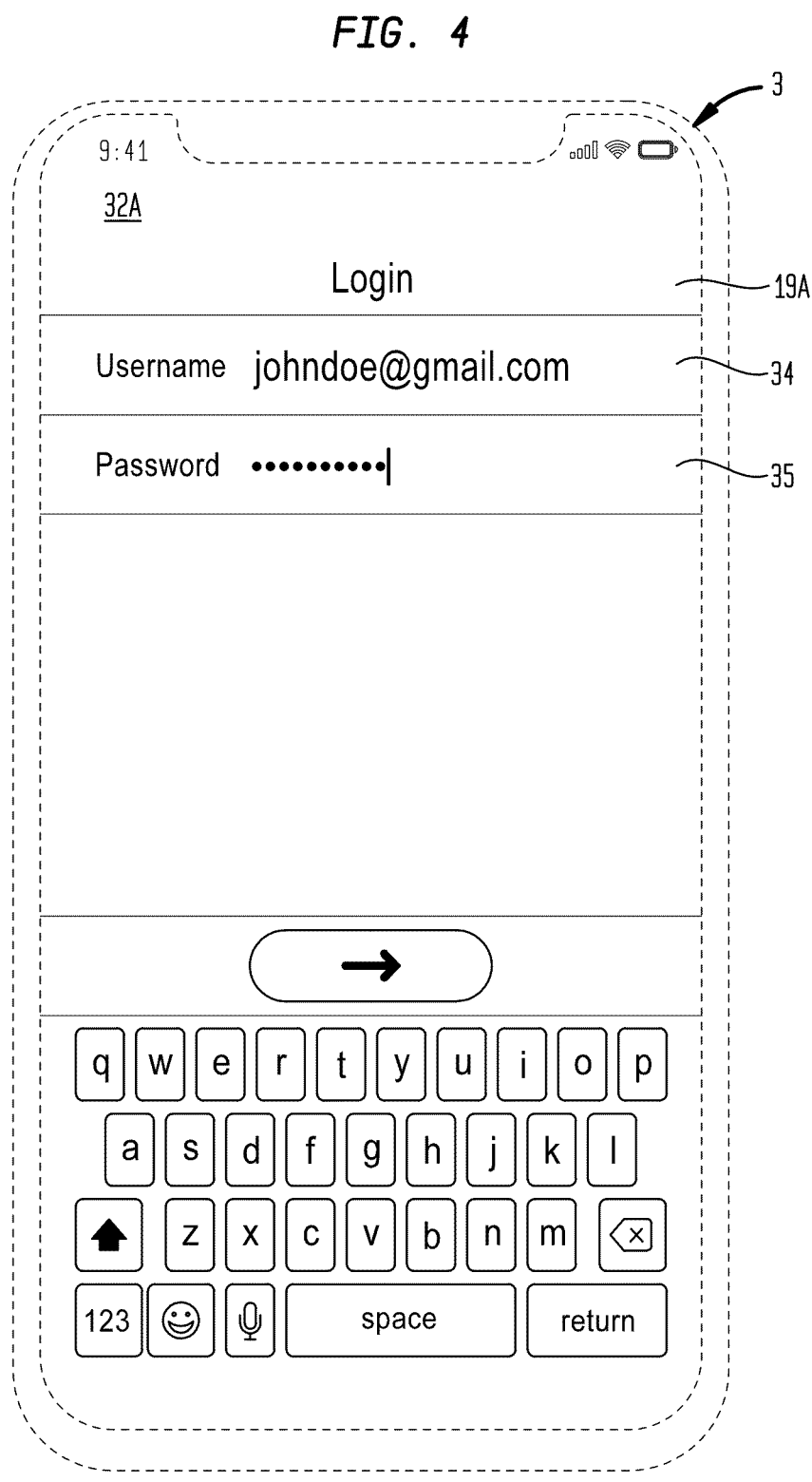
FIG. 4 illustrates a user interface depicting an embodiment of a login menu.

Signup Module. Now, with primary reference to FIGS. 1 through 3, embodiments of the program (5) can, but need not necessarily, include a signup module (24) which upon execution depicts a program access menu (25) (as shown in the example of FIG. 2) and a signup menu (28) (as shown in the example of FIG. 3) which by user indications (22) allows the user (14) to create a user account (26) under which the user (14) can be authenticated by the system (1) and correspondingly receive authorization to access content (6) provided by or connected to the system (1) and access or load the program (5) or other software applications (7). In the illustrative example of FIG. 2, the signup module (24) causes a program access menu (25) to be depicted containing media access dialog boxes (27) which allow selection of a media application (7b) through which the user (14) can access one or more servers (2) or databases (12) to utilize the program (5). For the purposes of this invention the term "dialog box" means a depiction of an area on the display surface (9) of the computing device (3) which prompts a user (14) to select commands, enter information, provides and icon, or otherwise control a functionality of the program (5). In the illustrative example, the media applications (7b) include an application such as OUTLOOK, FACEBOOK, GOOGLE, APPLE; however, these illustrative examples of media applications (7b) through which a user can gain access and download the program (5) are not intended to limit embodiments to these media applications (7b) but to provide a sufficient number of examples to allow the person of ordinary skill in art to make and use embodiments of the invention. The user (14) by user indications (22) in the graphical user interface (19A) can select a media application (7b) through which the user (14) gains access to the program (5). Selection of the media application (7b) by user indications (22) in a corresponding media access dialog box (27) causes the menu module (23) to depict a signup menu (28) including sign up dialog boxes (29) fillable with user information (30) to be associated with the user account (26). Now, with primary reference to FIG. 3, in the illustrative example, the signup dialog boxes (29) can require the user (14) to fill in First Name, Last Name, Email address, and a Password to create a user account (26); however, this illustrative example is not intended to preclude embodiments which require additional or different user information (30) to create a user account (26). If the user (14) creates a new user account (26), the signup module (24) can activate a subscription module (33) of the program (5). If the user (14) already has a user account (26) associated with access to the system (1) the signup menu (28) can further include a login link (31) (as shown in the example of FIG. 2) which activates a login module (32) of the program (5).

Login Module. Now, with primary reference to FIGS. 1 and 4, embodiments of the program (5) can, but need not necessarily, include a login module (32) which upon execution depicts a login menu (32A) which by user indications (22) allows the user (14) to login to an existing user account (26). As illustrative examples, a user (14) can login to a user account (26) for the purposes of accounting, security, and resource management by authenticating oneself with a user-name (34) and a password (35) as shown in the illustrative example, or by other credentials, such as: voice recognition, fingerprint recognition, or facial recognition.

Subscription Module. Now, with primary reference to FIGS. 1 and 5, in particular embodiments, the program (5) can include a subscription module (33) which functions to depict a subscription menu (33A) which by user indications (22) allows a user (14) to purchase or subscribe to use the functionalities of the system (1) for a specific period of time for a set price (the "subscription (34)". As illustrative examples, the subscription module (33) can present to the user (14) including a subscription identifier list (33B) including a plurality of subscription identifiers (33C) (for example "Free", "Basic" and "Business Premium") which can be selected by user indications (22) in the graphical user interface (19). The selection of one of the plurality of subscription identifiers (33C) activates the subscription module (33) to delimit the scope and breadth of the functionalities available to the user account (26) under the selected one of the subscription identifiers (33c) to the subscription (34).

Setup Module. Now, with primary reference to FIGS. 1 and 6 through 14, embodiments of the program (5) can include a setup module (35) that presents a user (14) with a sequence of setup dialog boxes which prompt the user (14) to provide information or select commands that lead the user (14) through a series of well-defined steps that allows the user (14) to enter settings or values to be assigned to the program (5) or the computing device (3). Certain embodiments can, but need not necessarily, be provided with defaults or presets which provide settings or values automatically assigned by or to the program (5) outside of user intervention. For the sake of brevity, the particular illustrative example depicted in FIGS. 6 through 14, and further described below, may include only one computing device (3); however, this not intended to preclude embodiments in which the operation of one computing device (3) coordinates the operation of a plurality of computing devices (3) in a computer client-administrator relationship within the system (1), or embodiments in which a first computing device (3a) and a second computing device (3b) have respective operation coordinated by the system (1) in which first and second computing devices (3a, 3b) have a relationship in which the program (5) functions are discretely allocated between the first and second computing device (3a, 3b), and in particular wherein a first computing device (3a) coordinates the functionalities or shares data with a group of computing devices (3c) to provide a client-service provider relationship, such as between a customer computing device (3a) and a one or more service provider computing devices (3b).

Properties Module. Now, with primary reference to FIGS. 1, 6 and 25, the setup module (35) can activate a properties module (37) which depicts a property entry menu (36) which provides a property entry dialog box (38) fillable by user indications (22) with a property identifier (39) of a property (16) (shown in FIG. 6 and in FIG. 25 as "S1"). In the illustrative example of FIG. 6, the property identifier (39) indicates "Home 1"; however, the property identifier (39) can be any alpha, numeric, alphanumeric, symbol, icon, text, geographic coordinates, or image or other manner of identification the user (14) desires to associate with a property (16). Upon entry of the property identifier (39), the properties module (37) can then prompt the user (14) with a next step dialog box (40) (shown in the example of FIG. 6 as "Next") to advance to the next menu in the setup instructions.

Property Added. Now, with primary reference to FIGS. 1 and 7, in particular embodiments, the setup module (35) can depict a property added success menu (40) which indicates that for the property identifier (39) depicted in the property added success menu (40), the property identifier (39) has been successfully added to the database (12) and associated with the user's account (26). The property added success menu (40) can further depict a success dialog box (40A) to affirm the association of the property with the user's account in the database (12) (shown in the illustrative example of FIG. 7 as "Ok"). Upon user indications (22) in the property added success menu (40) the properties module (37) can then prompt the user (14) with the next step dialog box (40) (shown in the example of FIG. 7 as "Next") to advance to the next menu in the setup instructions.

Resources Module. Now, with primary reference to FIGS. 1 and 8 through 16 and 25, the setup module (35) can activate a resource module (41) which can depict a resource entry menu (42) which provides a resource entry dialog box (43) fillable by user indications (22) with a resource identifier (44) of a resource (17). In particular embodiments, the setup module (35) can serially depict one or more default resource identifiers (44) in the resource entry dialog box (43). In the illustrative example of FIG. 8, the default resource identifier (44) can be "Water Valve" (shown in FIG. 25 as "S2"); however, in particular embodiments, there may not be a default resources entry menu (42) and a resource entry dialog box (43) can be depicted in which the user (14) by user indications (22) in the resource entry dialog box (43) can enter a resource identifier (44). The resource identifier (44), when not depicted as a default resource identifier (44) can be any alpha, numeric or alphanumeric, symbol, icon, text, geographic coordinates, or image or other manner of identification the user (14) desires to associate with a resource (17) (shown in FIG. as "S3"). Whether the resource (17) is depicted as a default resource identifier (44), or by entry of the resource identifier (44) by user indications (22), the resources module (41) can then prompt the user (14) with a resource description dialog box (45) (shown in the example of FIG. 8 as "Add Description"). By user indications (22) in the resource description dialog box (45), the resource (17) can be described by the physical appearance of the resource (17), a route in the property (16) to a resource location (11') (as shown in the example of FIG. 1), or other description to allow a user (14) to physically proceed to the resource location (11') in, on or about the property (16). In particular embodiments, the resource module (41) can depict a resource contact dialog box (46) fillable by user indications (22) with resource contact information (47). In the illustrative example, the resource contact dialog box (47) can prompt the user (14) to enter a "Contact Phone Number"; however, the resource contact dialog box (46) can prompt entry of other contact information, such as: contact email address, contact facsimile address, contact social media address, contact physical address, or combinations thereof.

Figure 9:
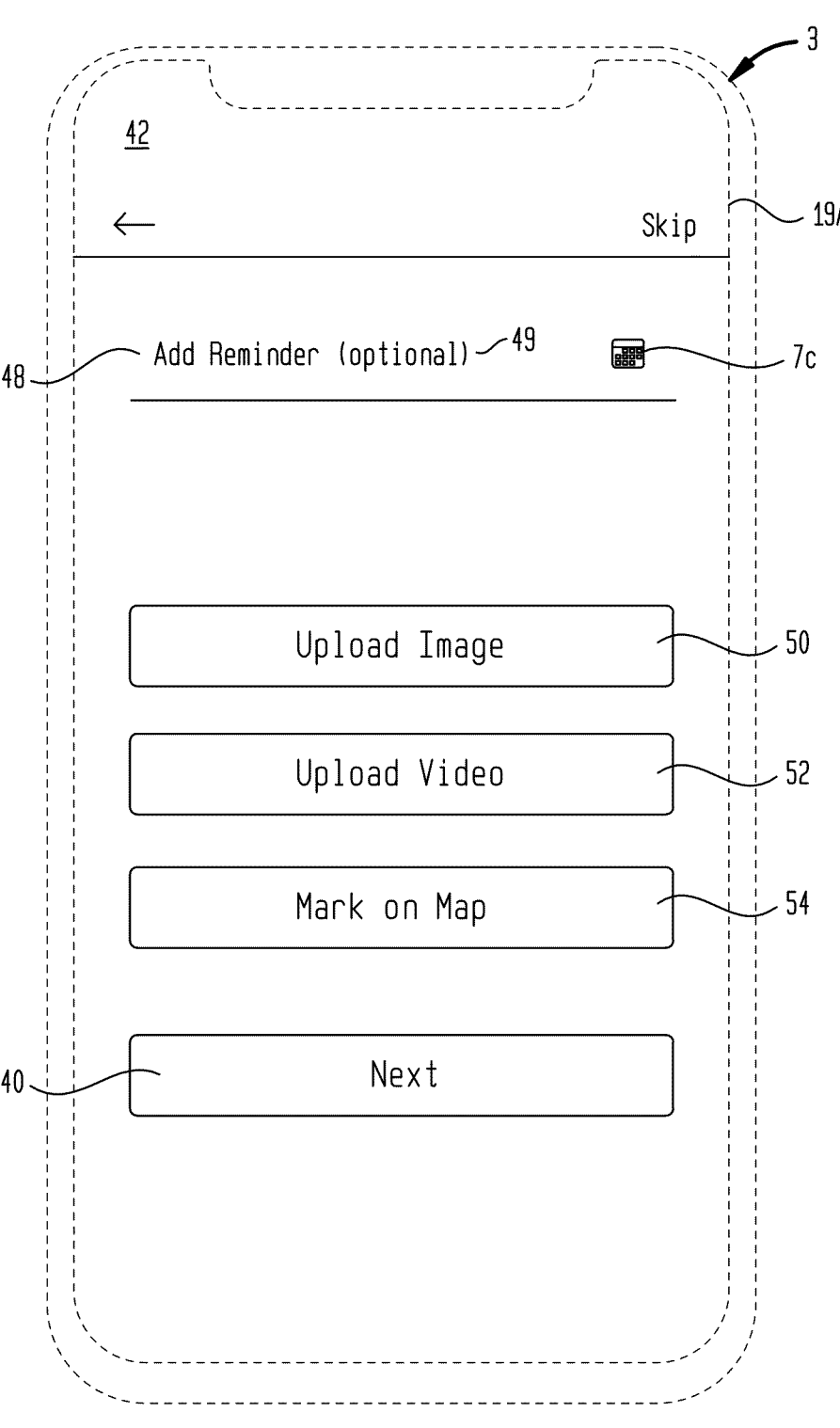
FIG. 9 illustrates a user interface depicting an embodiment of a resource metadata upload menu.
Figure 10:
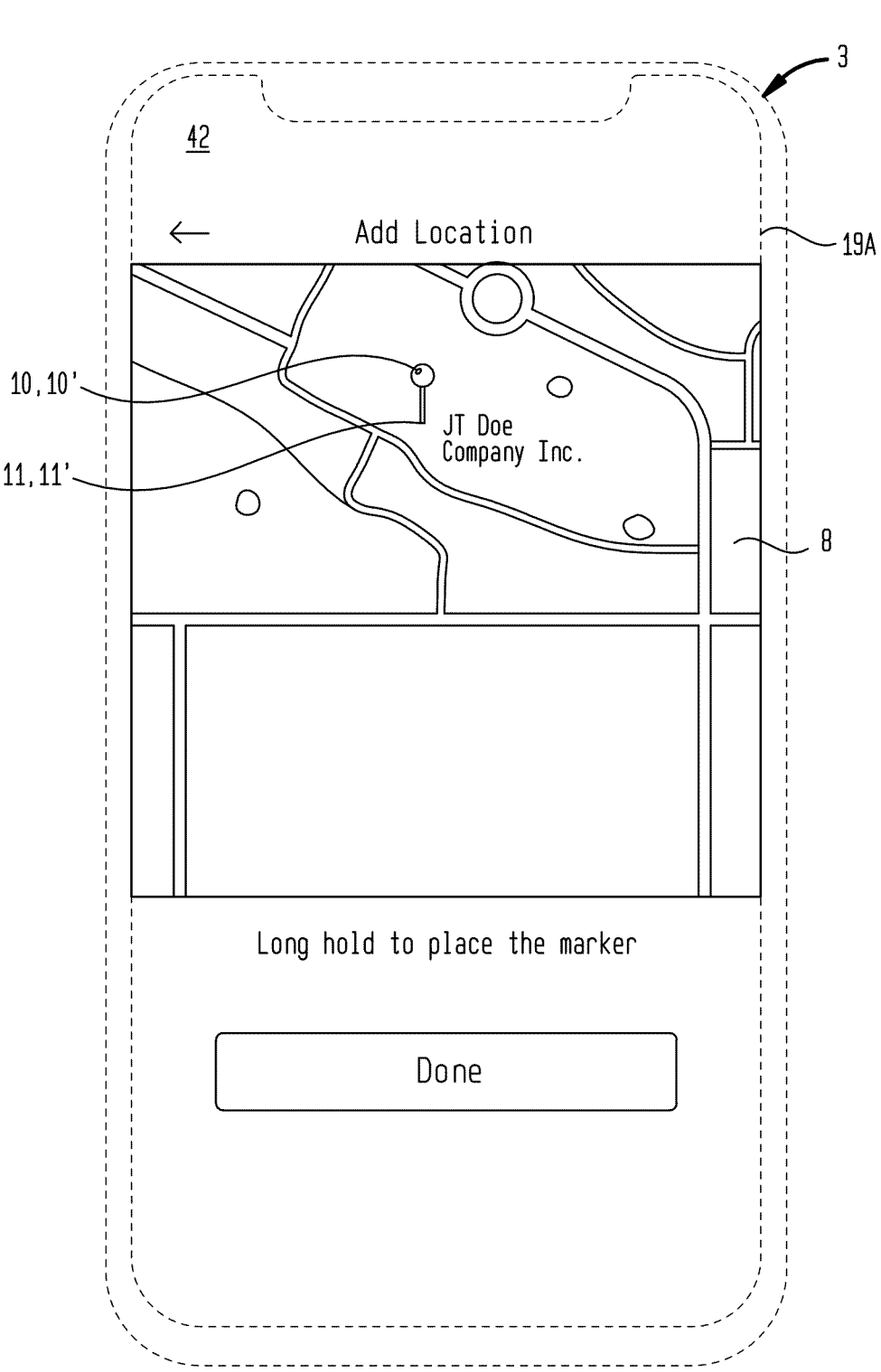
FIG. 10 illustrates a user interface depicting an embodiment of a mapping and navigation menu to placemark a property identifier or a resource identifier.
Figure 11:
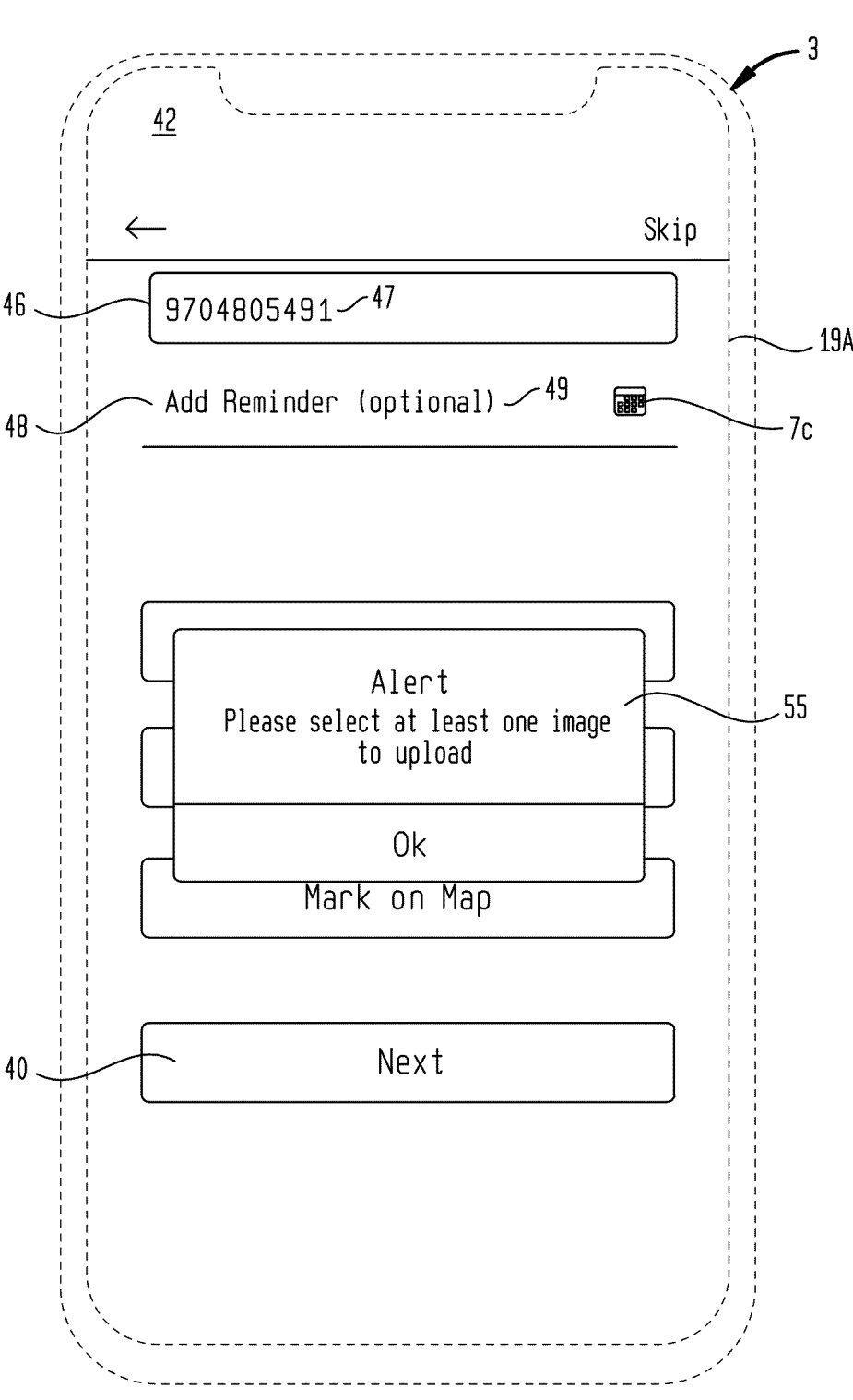
FIG. 11 illustrates a user interface depicting an embodiment of a resource metadata upload alert menu.
Figure 12:
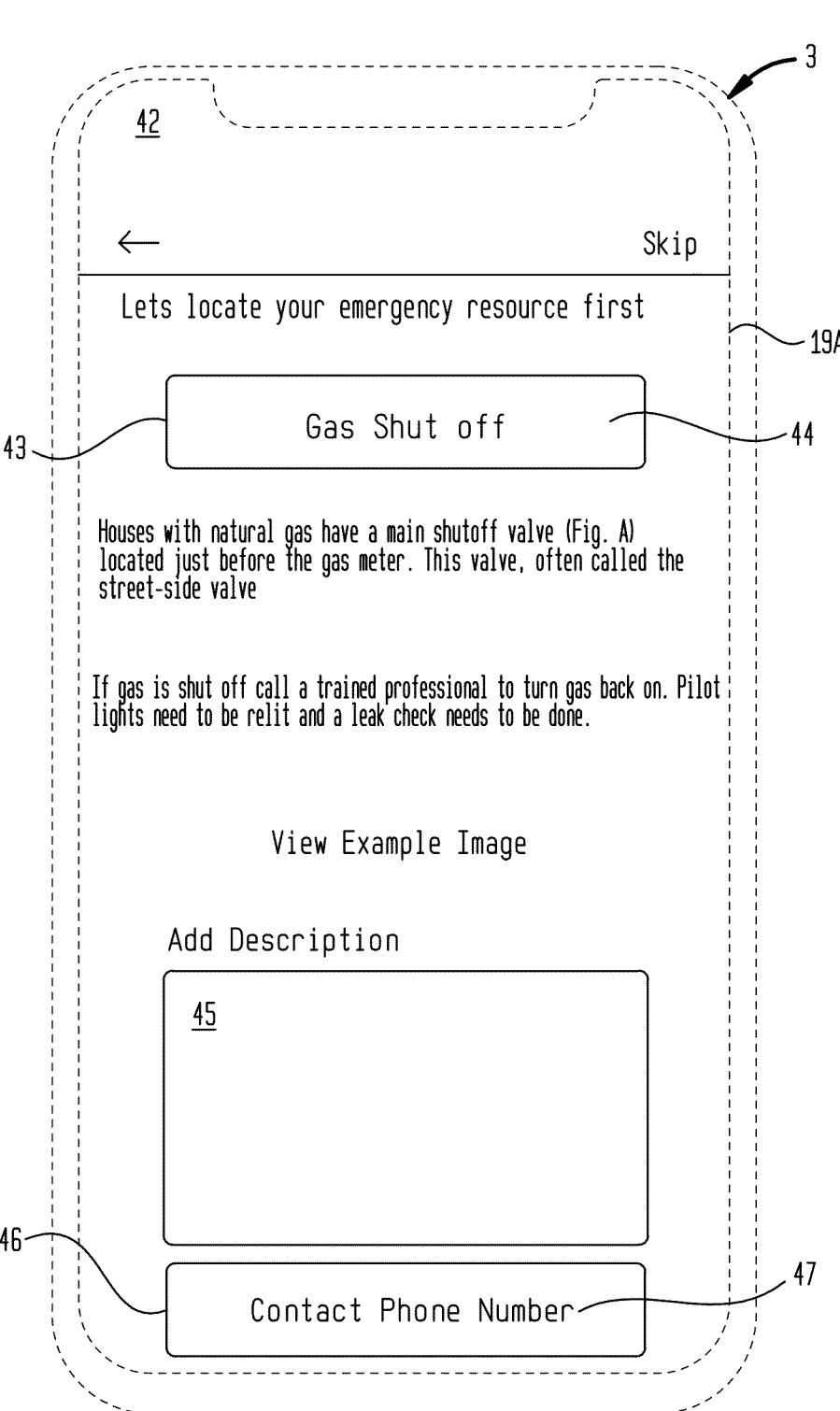
FIG. 12 illustrates a user interface depicting an embodiment of a default property resource entry menu to enter resource metadata pertaining to a gas shut off valve.

Now, with primary reference to FIG. 9, in particular embodiments, the resource module (41) can function to depict a resource reminder dialog box (48) in the resource entry menu (42) in which by user indications (22) a user (14) can enter a resource reminder (49) associated with the resource (17). In particular embodiments, the resources reminder dialog box (48) can provide access to a reminder application (7c). As one illustrative example, the reminder application (7c) can comprise an Apptoto appointment reminder for MICROSOFT OUTLOOK. Again, referring primarily to FIG. 9, in particular embodiments, the resource module (41) can function to depict a resource image upload dialog box (50). By user indications (22) in a resource image upload dialog box (50), the resources module (41) can permit the computing device (3) to capture a resource image (51) and upload a resource image (51) or upload an existing resource image (51) of a resource (17) to the resource image upload image dialog box (50) (as shown in the example of FIG. 1 and FIG. 25 "S2"). The process can be repeated by serial user indications in a plurality of resource image upload image dialog boxes (50). Again, with primary reference to FIG. 9, in particular embodiments, the resources module (41) can function to depict one or more resource video upload dialog boxes (52). By user indications (22) in a resource video upload dialog box (52), the resource module (41) can permit the computing device (3) to capture and upload a resource video (53) or upload an existing resource video (53) of a resource (17) to the resource upload video dialog box (52). The process can be repeated by serial user indications (22) in a plurality of resource video upload dialog boxes (52). Again, with primary reference to FIG. 9, in particular embodiments, the resource module (41) can function to depict one or more resource geographic representation location upload dialog boxes (54). By user indications (22) in one or more resource geographic representation location upload dialog boxes (54), the resources module (41) can access the mapping and navigation application (7a) and depict a geographic representation (8) in which the user (14) can pan and zoom to the resource location (11') in, on, or about the property (16) (as shown in the example of FIG. 10). The user (14) by user indications in the geographic representation (8) can create resource location icon (10') in the geographic representation (8) at the resource location (11') of the resource (17). Now, with primary reference to FIG. 11, in particular embodiments, the resource module (41) can depict an alert resource dialog box (55) which necessitates that the user (14) upload at least one resource image (51), upload at least one resource video (53), or upload a geographic representation (8) including a resource location icon (11'), or necessitate uploading each of a resource image (51), a resource video (53), and a geographic representation (8) including a resource location icon (11"), or combinations of two or more thereof, or other resource metadata (13') (individually or collectively the resource metadata (13')) to complete entry of the resource (17) in the system (1). Now, with primary reference to FIGS. 12 and 13, in particular embodiments, the resources module (41) can include additional default resource identifiers (44). In the illustrative example of FIG. 12, the default resource (17) can be a "Gas Shut Off Valve." Again, with primary reference to FIG. 13, the default resource (17) can be "Circuit Breaker Box." Each of the default resource entry menus (42) can be depicted and function similar to the illustrative example of the "Water Valve" resource entry menu (42).

Resource Added. Now, with primary reference to FIG. 14, in particular embodiments, the setup module (35) can depict a resource added success menu (56) which indicates that for the resource identifier (44) depicted in the resource added success menu (56), the resource identifier (44) along with the resource image(s) (51), resource video(s) (53), and geographic representation (8) including the resource location icon (11") has been successfully added to one or more databases (12) and associated with the user account (26). The resource added success menu (56) can further depict a resource added success dialog box (57) necessitating the user (14) to affirm the association of the resource metadata (13') with the user account (26) in the one or more databases

Figure 14:
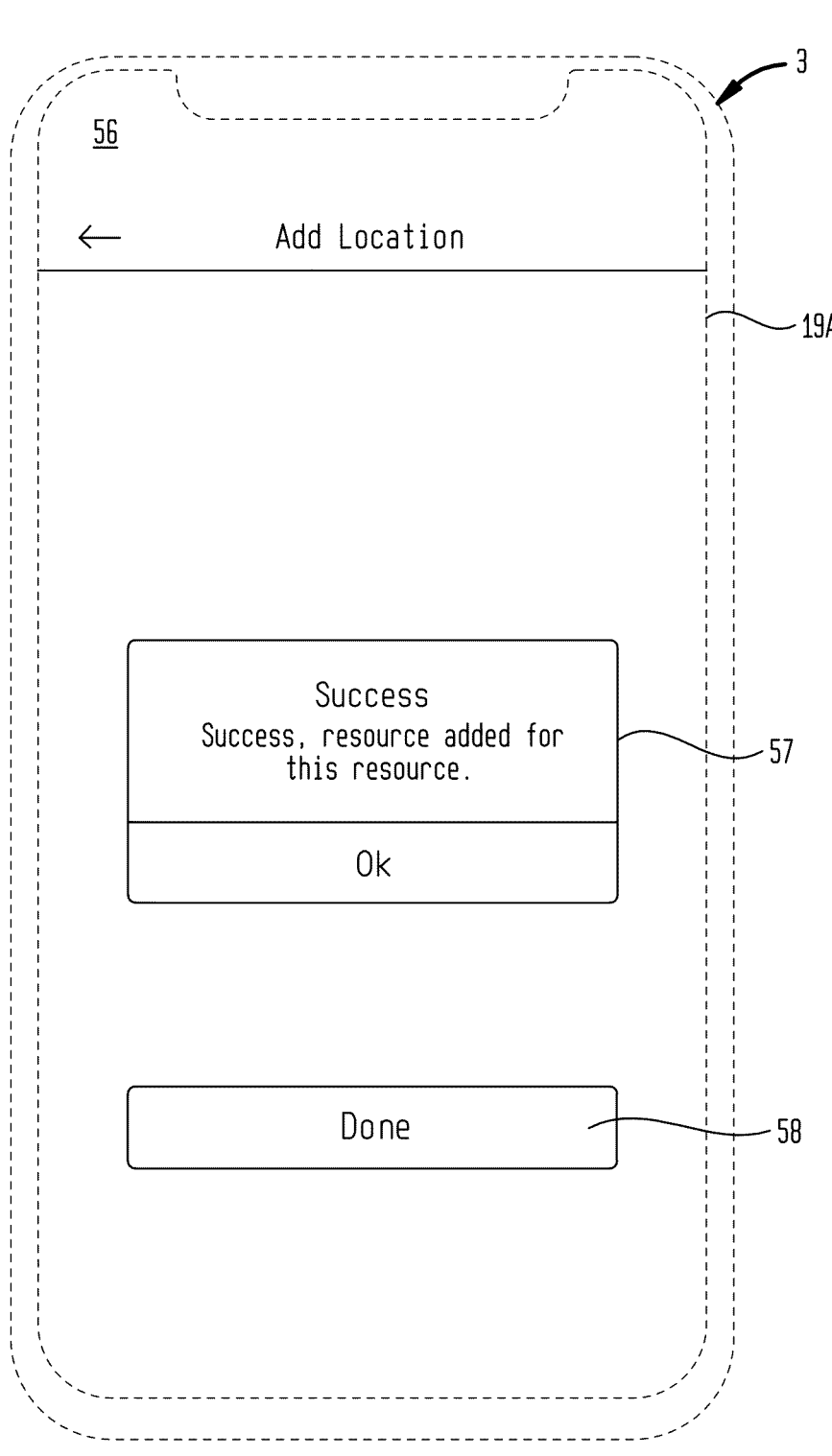
FIG. 14 illustrates a user interface depicting an embodiment of resource added success menu.

(12) (shown in the illustrative example of FIG. 14 as "Ok"). Upon user indications (22) in the resource added success menu (56) the resource module (41) can then prompt the user (14) with a resource added dialog box (58) (shown in the example of FIG. 14 as "Done") to advance to the next menu in the setup instructions.

Figure 15:
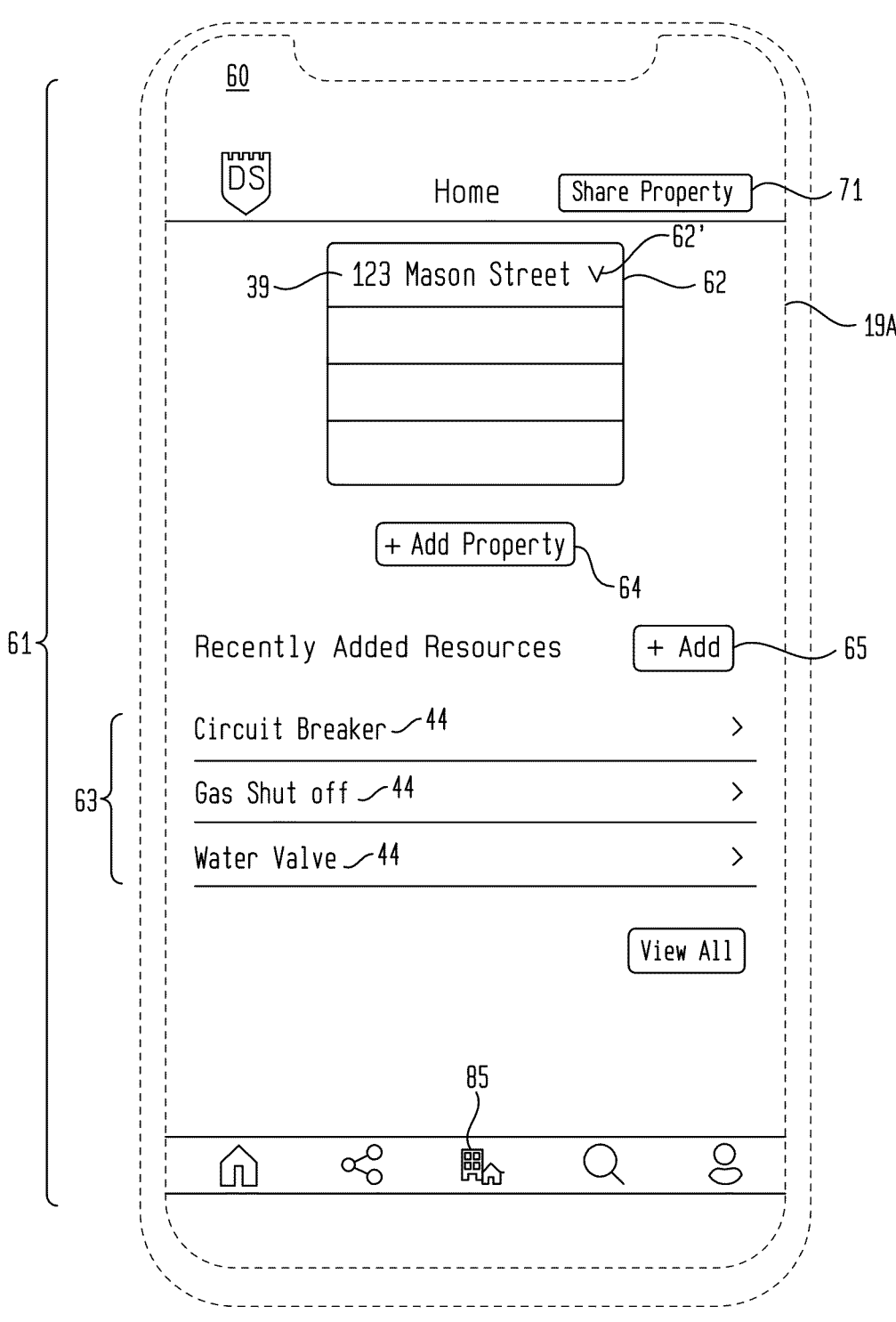
FIG. 15 illustrates a user interface depicting an embodiment of a homepage menu.

Home Page. Now, with primary reference to FIG. 15, in particular embodiments, upon completion by user of the default property entry menus (36) depicted by the property module (37) or default resource entry menus (42) depicted by the resource module (41), the setup module (35), can activate a homepage module (59) to depict a homepage menu (60) (shown in FIG. 25 as "S4"). The home page menu (60) can provide a homepage dashboard (61) which provides a global overview of functions of the program (5) within the system (1). In particular embodiments, the homepage menu (60) can depict a property identifier dialog box (62) which by user indications can depict a property identifier list (62') including property identifiers (39) associated with the user account (26). In the illustrative example of the homepage menu (60) the property identifier list (62) comprises a dropdown list including a plurality of property identifiers (39). The user (14) by user indications (22) in the property identifier list (62) can select a property identifier (39) associated with a property (16) (as shown in the example of FIG. 15 as "123 Mason Street", shown in FIG. 25 as "S6"). Selection of a property identifier (39) can activate the resource module (41) to depict a resource identifier list (63) of the resource identifiers (44) associated with the selected property identifier (39) of a property (16) in the user account (26) (in the example of FIG. 15 depicts resource identifiers "Water Valve", "Gas Shut Off" and "Circuit Breaker Box", as shown in FIG. 25 as "S7"). In particular embodiments, each of the resource identifiers (44) can be selected by user indications (22) to activate the resource module (41) to depict the resource menu (42) (as shown in the example of FIGS. 8 through 14) along with the resource metadata (13') corresponding to the selected resource identifier (44) associated with the property (16).

Figure 6:
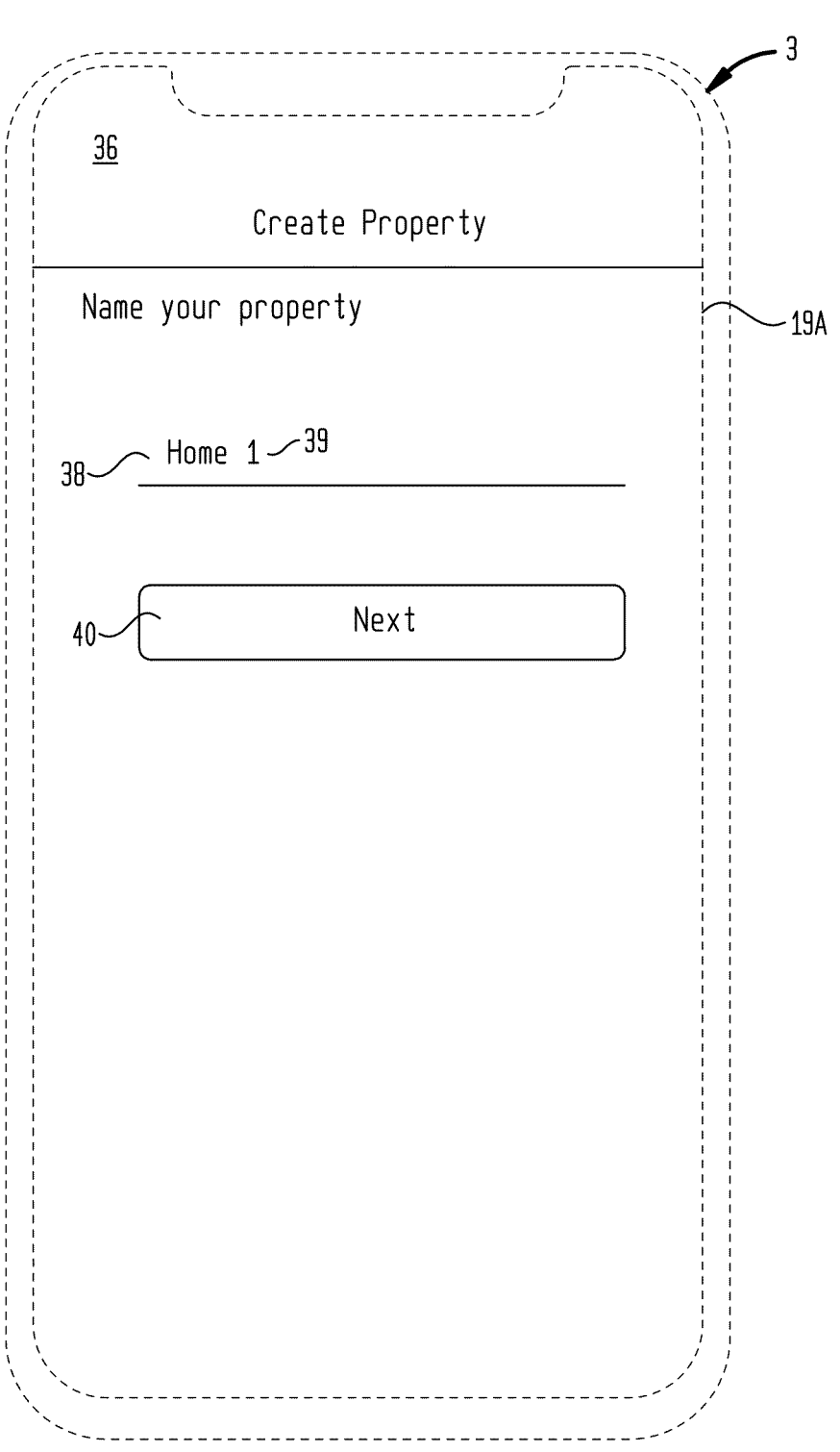
FIG. 6 illustrates a user interface depicting an embodiment of a property entry menu.
Figure 7:
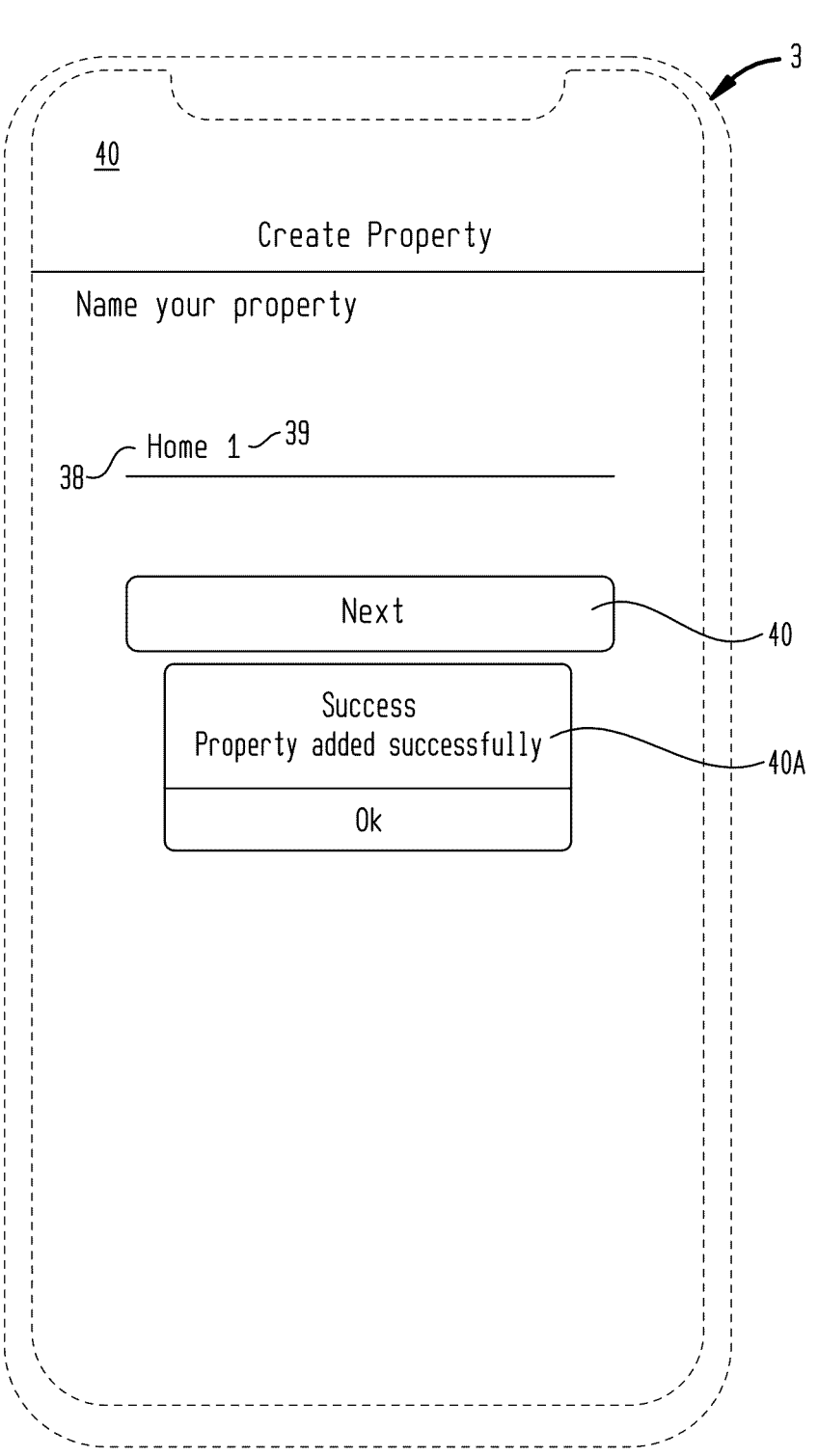
FIG. 7 illustrates a user interface depicting an embodiment of a property added success menu.
Figure 8:
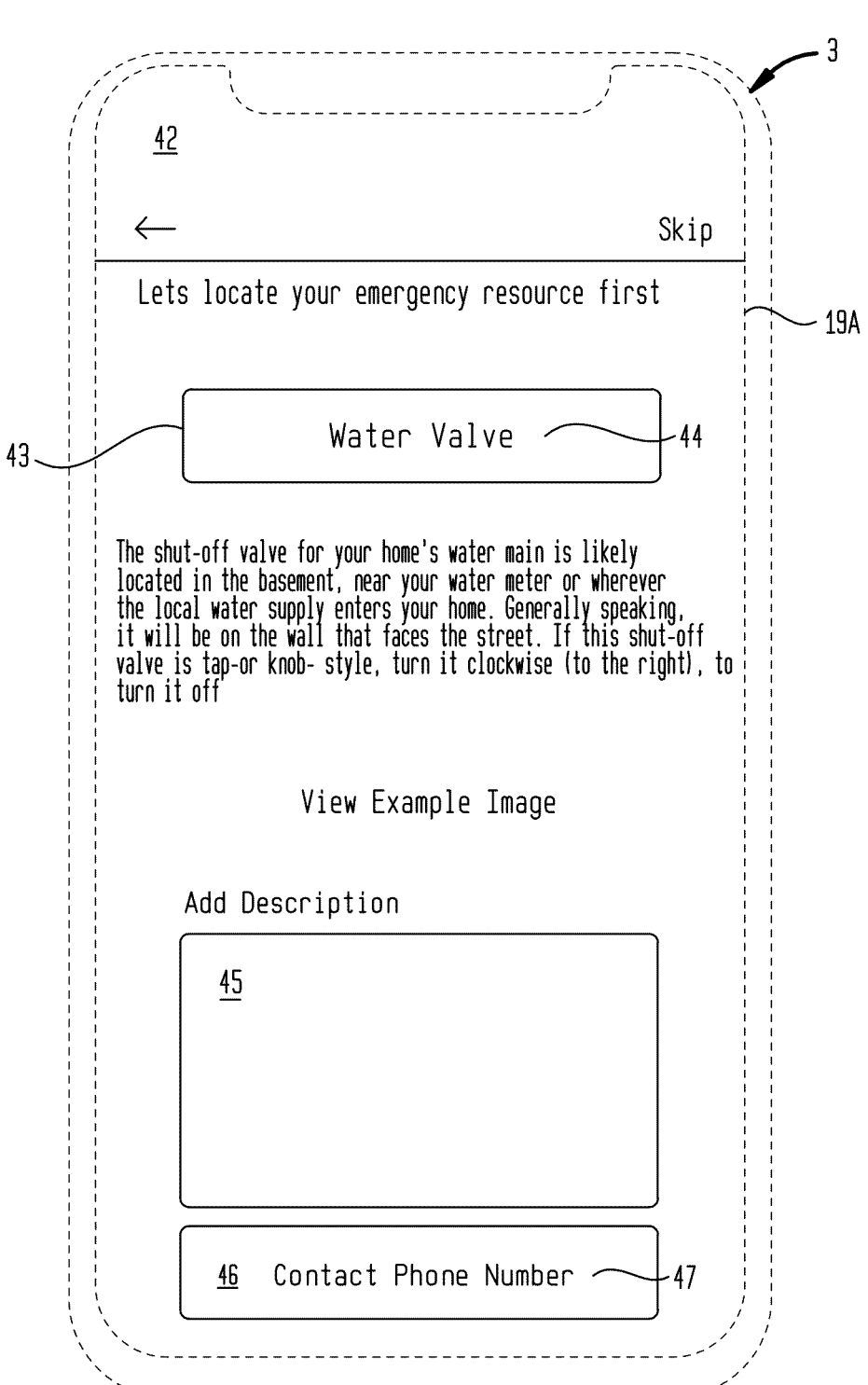
FIG. 8 illustrates a user interface depicting an embodiment of a default resource entry menu to enter resource metadata pertaining a water shut off valve.

Add Property. Again, with primary reference to FIG. 15, in particular embodiments, the homepage menu (60) can include an add property dialog box (64) which by user indications (22) activates the property module (37) to depict the property menu (36) including the property entry dialog box (38) fillable by user indications (22) with a property identifier (39) and property metadata (13') of a property (16) (as shown in the example of FIG. 6 and FIG. 25 "S5") in same or similar process to that above described.

Add Resource. Again, with primary reference to FIG. 15, in particular embodiments, the homepage menu (60) can include an add resource dialog box (65) which by user indications (22) activates the resources module (41) to depict the resource entry menu (42) which provides the resource entry dialog box (43) fillable by user indications (22) with a resource identifier (44) and resources metadata (13") of a resource (17) (as shown in the examples of FIGS. 8 through 14) in same or similar process to that above described.

Upgrade Subscription. Again, with primary reference to FIGS. 15 and 16, in particular embodiments, if in the home page menu (60), the user attempts to use functionalities of the program (5) or the system (1) that are not encompassed by the scope or breadth of user's subscription (34), the subscription module (33) can be activated and depict a subscription update notice menu (66) indicating that the user has attempted to use functionalities of the program (5) or the system (1) that are not encompassed by user's subscription

Figure 5:
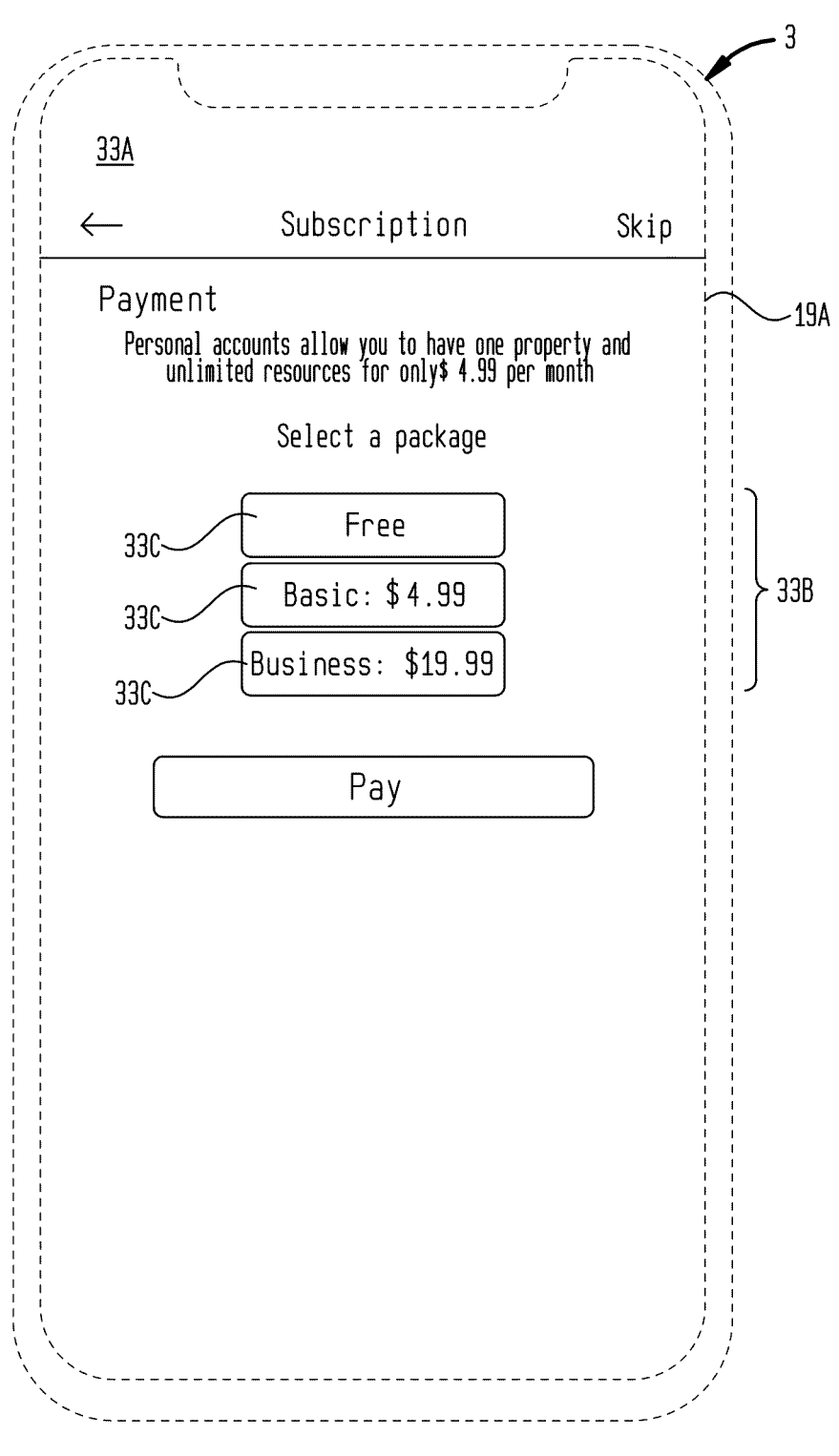
FIG. 5 illustrates a user interface depicting an embodiment of a subscription menu.
Figure 16:
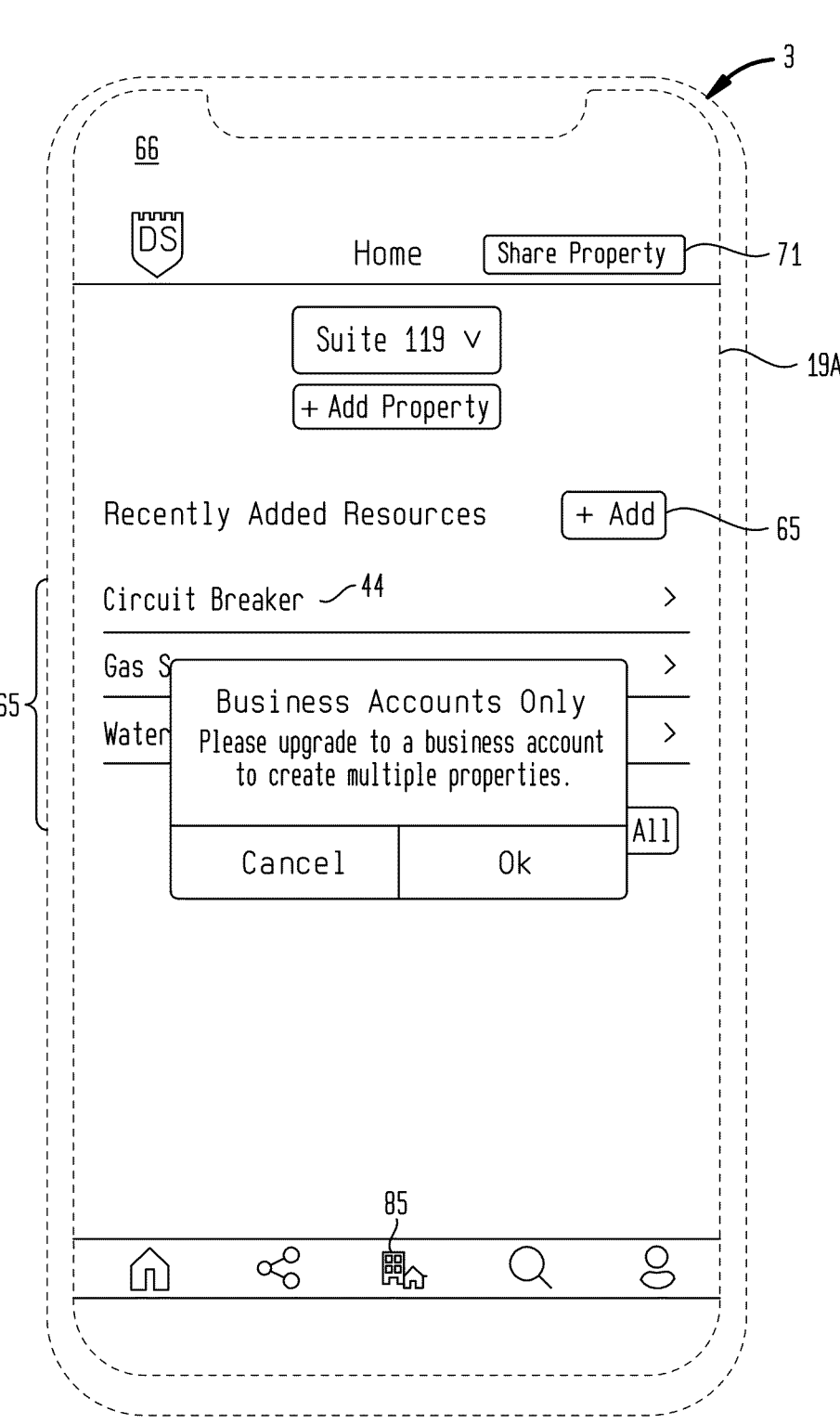
FIG. 16 illustrates a user interface depicting an embodiment of subscription update menu.
Figure 17:
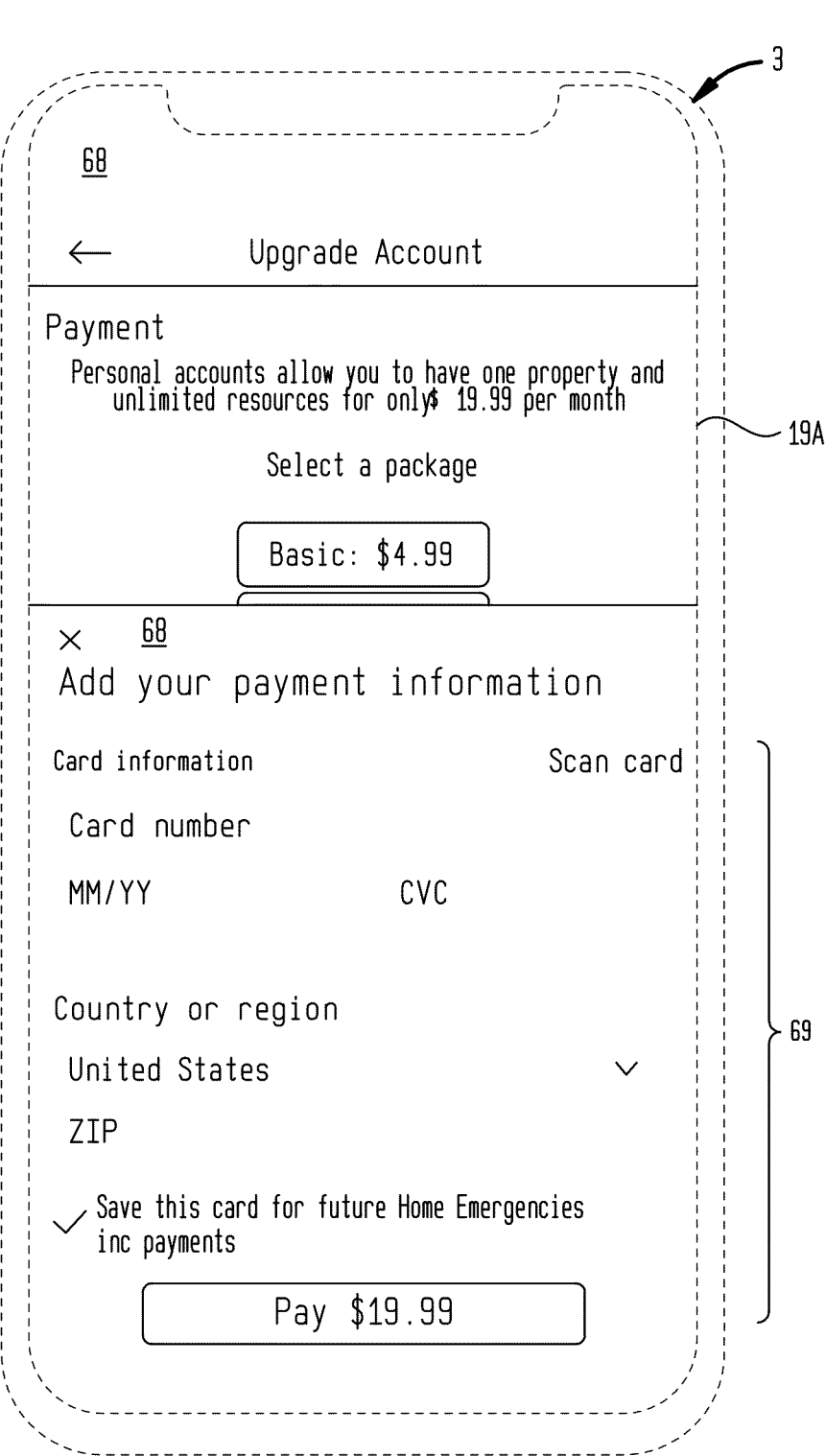
FIG. 17 illustrates a user interface depiction an embodiment of subscription payment menu.

(34) (in the example of FIG. 16, the notice states "Business Accounts Only" and shown in FIG. 25 "S8"). In the example of FIG. 16, when the user (14) having a basic subscription (34) attempts to associate property metadata (13') of more than one property (16) to a user account (26), whether for use by the user (14) or shared with a user group (15), the subscription module (33) may require that the user subscription (34) be upgraded by payment of additional fees. By user indications (22) in the subscription update notice menu (66) the subscription module (33) can function to depict the subscription menu (33A) (as shown in the example of FIG. 5) as above described. The user (14) by user indications (22) in the subscription menu (33A) can upgrade the subscription (34) associated with the user account (26) to allow use of desired functionalities of the program (5) or system (1). Now with primary reference to FIG. 17, selection of a subscription identifier (33) by user indications (22) in the subscription menu (33A) can activate the subscription module (33) to access a payment application (7d), such as PAYPAL or SQUARE PAYMENTS to depict a payment menu (68) which by user indications (22) can fill payment dialog boxes (69) to effect payment for the upgrade to the subscription (34).

Share Module. Again, with primary reference to FIG. 15, particular embodiments of the program (5) can include a share module (70) which can function to transfer property metadata (13') or resource metadata (13"), or a combination thereof, associated with a user account (26) of a first user (14a) viewable on a first computing device (3') to a second user (14b) to view on a second computing device (3b) or a user group (15) to view on a group of computing devices (3c).

Figure 18:
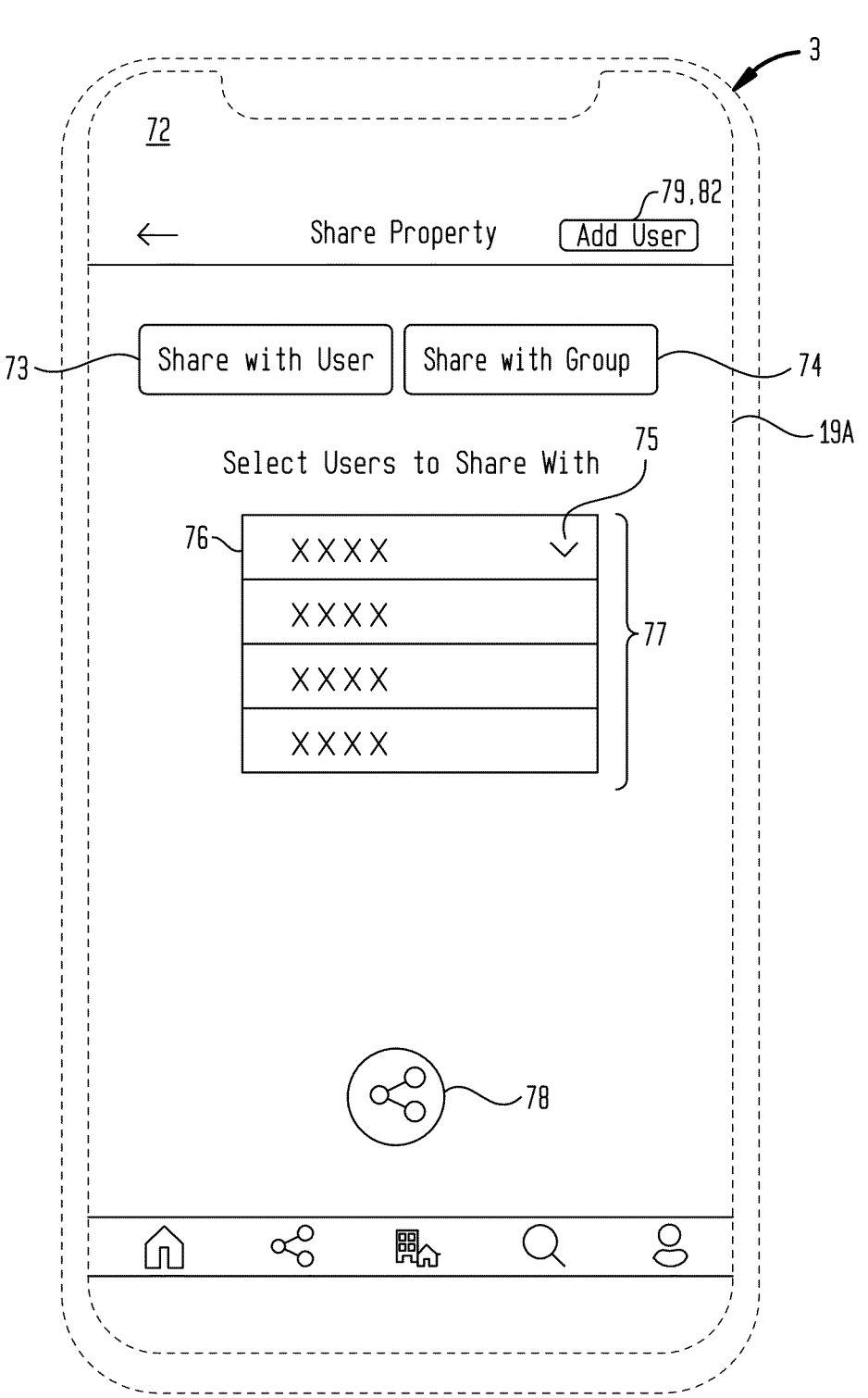
FIG. 18 illustrates a user interface depicting an embodiment of property share menu.
Figure 19:
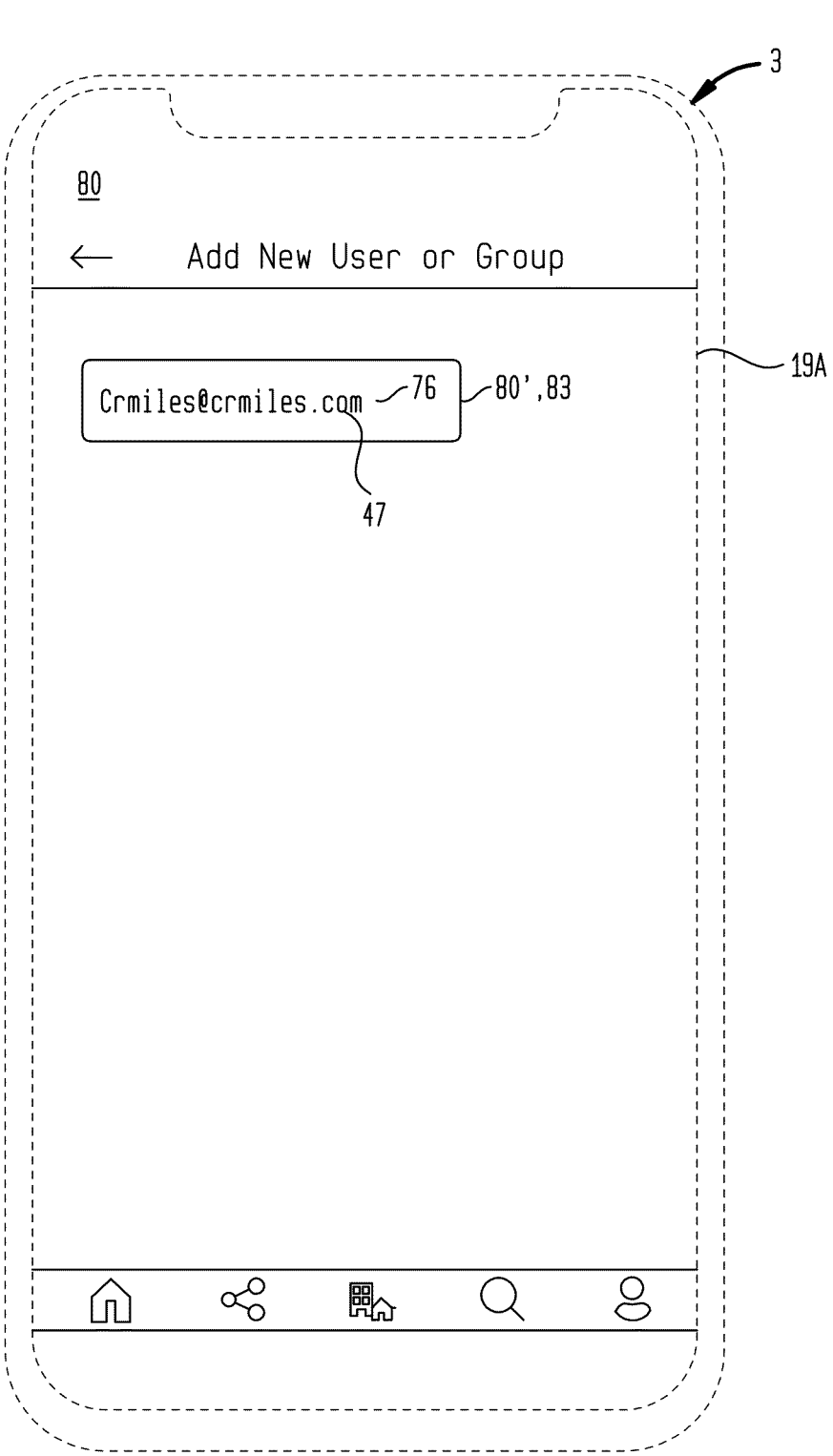
FIG. 19 illustrates a user interface depicting an embodiment of add user menu.
Figure 20:
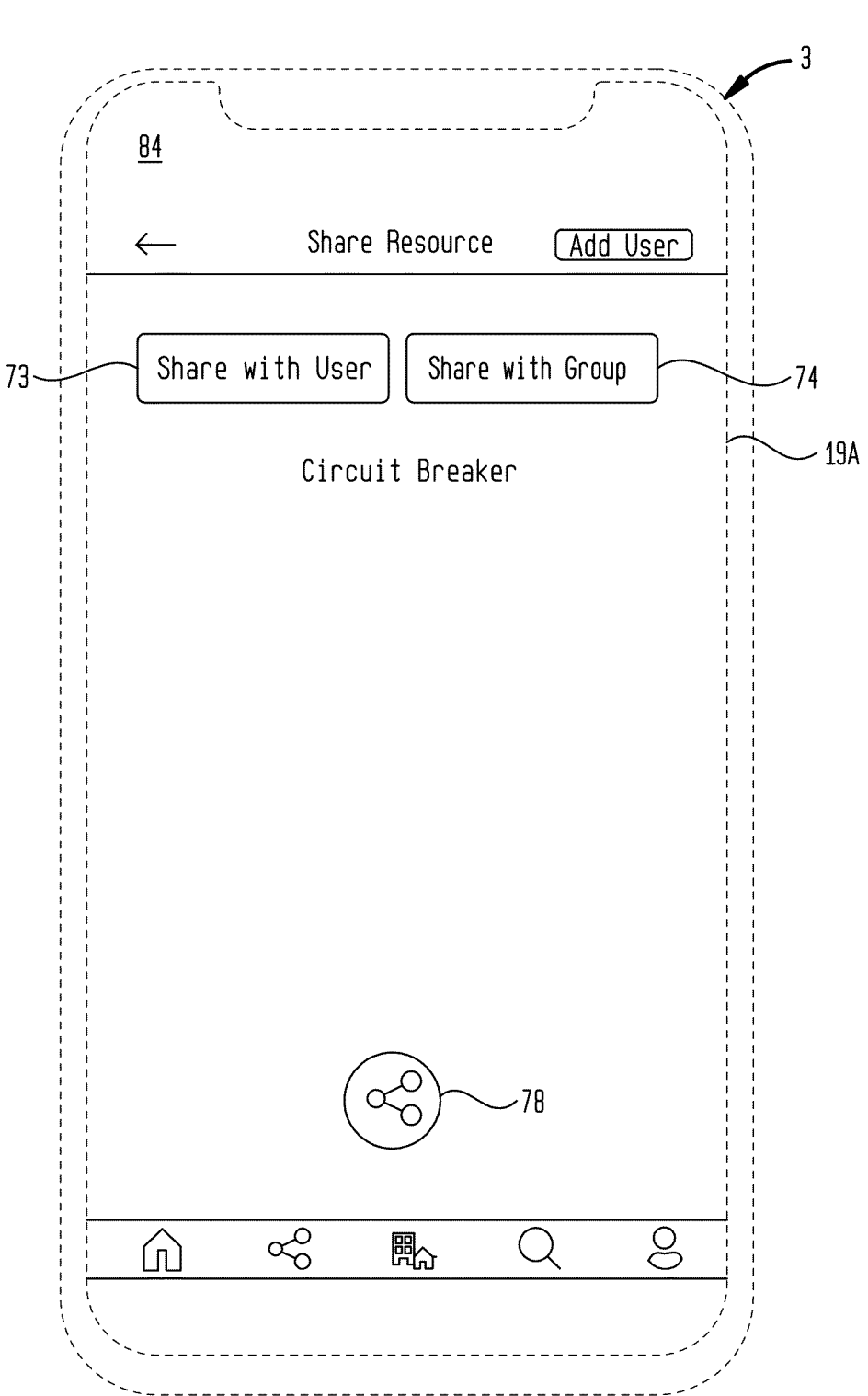
FIG. 20 illustrates a user interface depicting an embodiment of a resource share menu.

Property Share. In the illustrative example of FIGS. 1 and 15, upon selection by a first user (14a) of a property identifier (39) in the homepage menu (60), as above described, the share module (70) can be activated by first user indications (22') in a property share dialog box (71) depicted in the home menu (60) (in the example of FIG. 15 "Share Property", shown in FIG. as "S9"). Now, with primary reference to FIG. 18, the share module (70) can function to depict a property share menu (72) (shown in FIG. 25 as "S10"). In particular embodiments, the property share menu (72) can depict a share with user dialog box (73) (in the example of FIG. 18 "Share With User", shown in FIG. 25 as "S11") or depict a share with group dialog box (74) (in the example of FIG. 18 "Share With Group", shown in FIG. 25 as "S12"), or depict both. By user indications (22) in the property share with user dialog box (73), the share module (70) can function to depict a user identifier list (75) including a plurality of user identifiers (76) each selectable by user indications (22) to associate one user identifier (76) with the property metadata (13') associated with the selected property identifier (39) in the system (1) (as shown in FIG. 18 and in FIG. 25 as "S13"). Similarly, by user indications (22) in the property share with group dialog box (74), the share module (70) can function to depict the user identifier list (75) including the plurality of user identifiers (76) each user identifier (76) selectable by user indications (22) to associate a user identifier group (77) with the property metadata (13') associated with the selected property identifier (39) in the system (1) (as shown in FIG. 18 and in FIG. 25 as "S14"). The user (14) can by user indications (22) in a share icon (78) authorize retrieval of the property metadata (13') associated with the selected property identifier (39) by the users (14) associated with the selected user identifier (76) or group user identifiers (77).

Add User. Again, with primary reference to FIGS. 18 and 19, upon first user (22') selection of a property share with user dialog box (73) (in the example of FIG. 18 "Share With User"), the share module (70) can function to depict an add user dialog box (79). Now, with primary reference to FIG. 19, by first user indications (22') the share module (70) can function to depict an add user menu (80) depicting an add user identifier dialog box (80') fillable with a user identifier (76) being or associated with user contact information (47), such as: contact email address, contact facsimile address, contact social media address, or combinations thereof, which can used to allow retrieval and viewing of property metadata (13') or resource metadata (13") by a user (14) (shown in FIG. 25 as "S15").

Add Group. Again, with primary reference to FIGS. 18 and 19, upon a first user selection of a property share with group dialog box (74) (in the example of FIG. 18 "Share With Group"), the share module (70) can function to depict an add group dialog box (82) (as shown in FIG. 25 as "S16"). Now, with primary reference to FIG. 19, by user indications (22) can depict an add group identifier dialog box (83) fillable with a plurality of second user identifiers (76) (as shown in FIG. 25 as "S17") each associated with user contact information (47), such as: contact email address, contact facsimile address, contact social media address, or combinations thereof, which can used to allow retrieval and viewing of property metadata (13') or resource metadata (13") by a user group (15) (shown in FIG. 25 as "S18").

Figure 21:
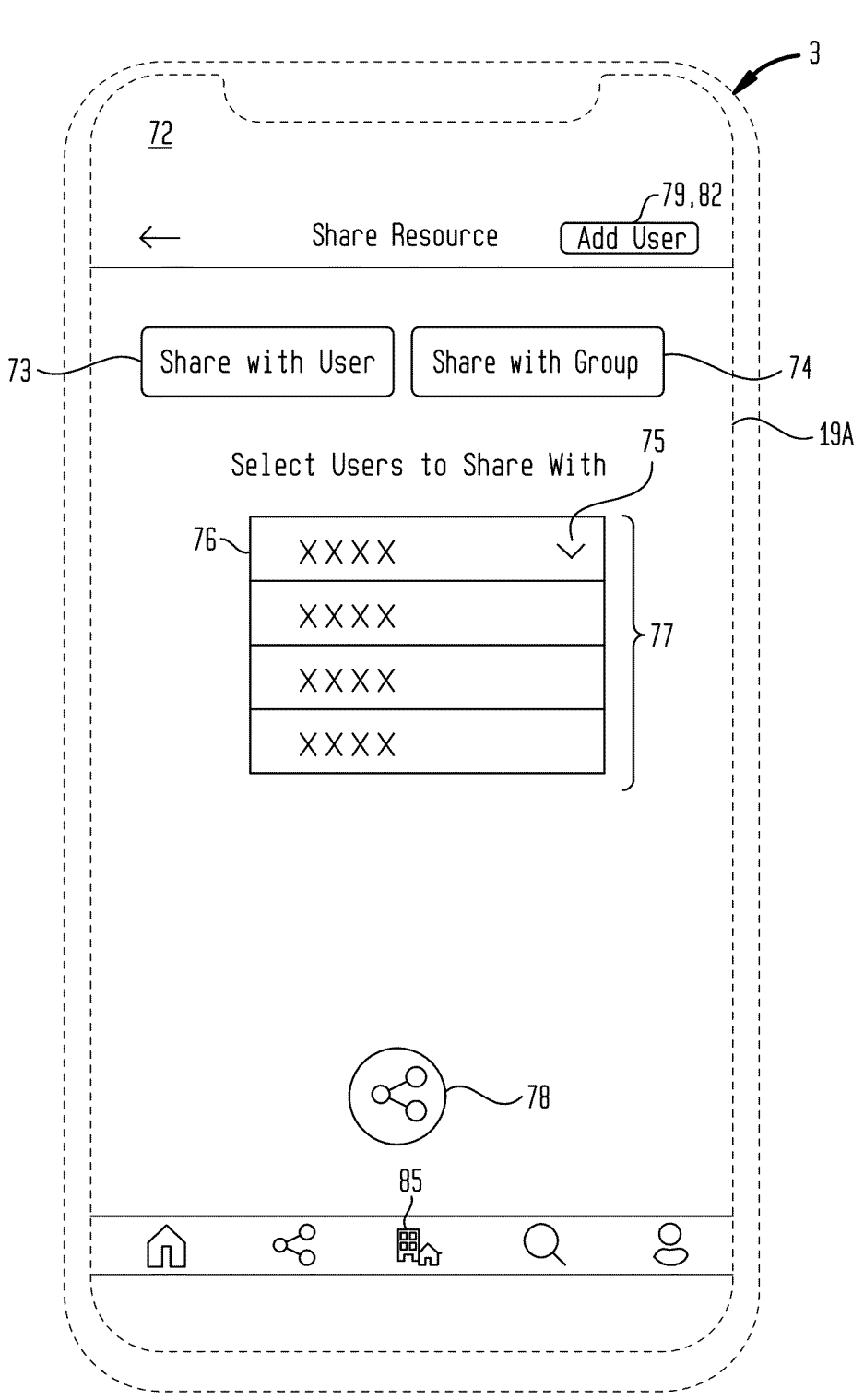
FIG. 21 illustrates a user interface depicting an embodiment of a user or group identifier selection menu.
Figure 22:
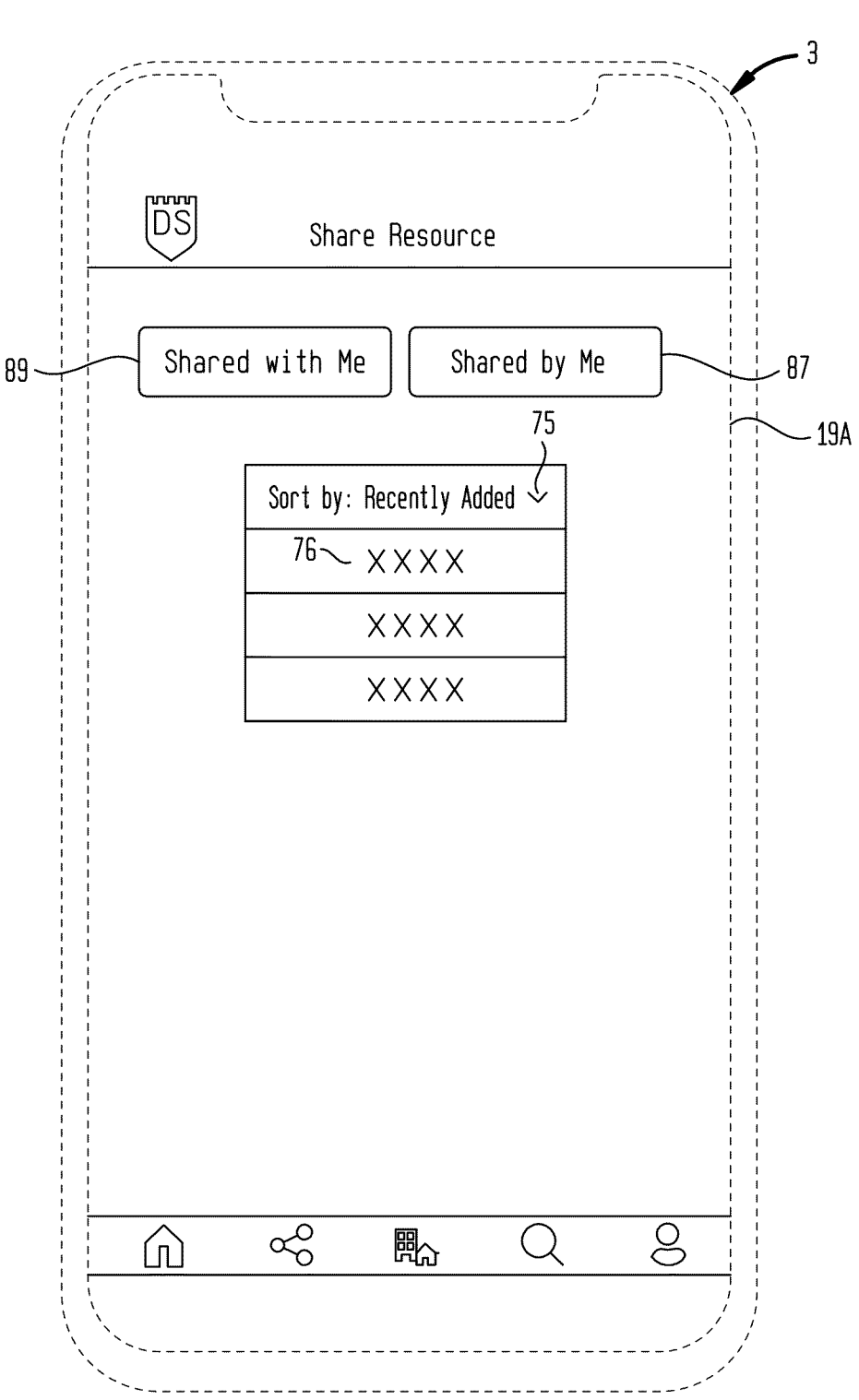
FIG. 22 illustrates a user interface depicting an embodiment of shared property menu.
Figure 23:
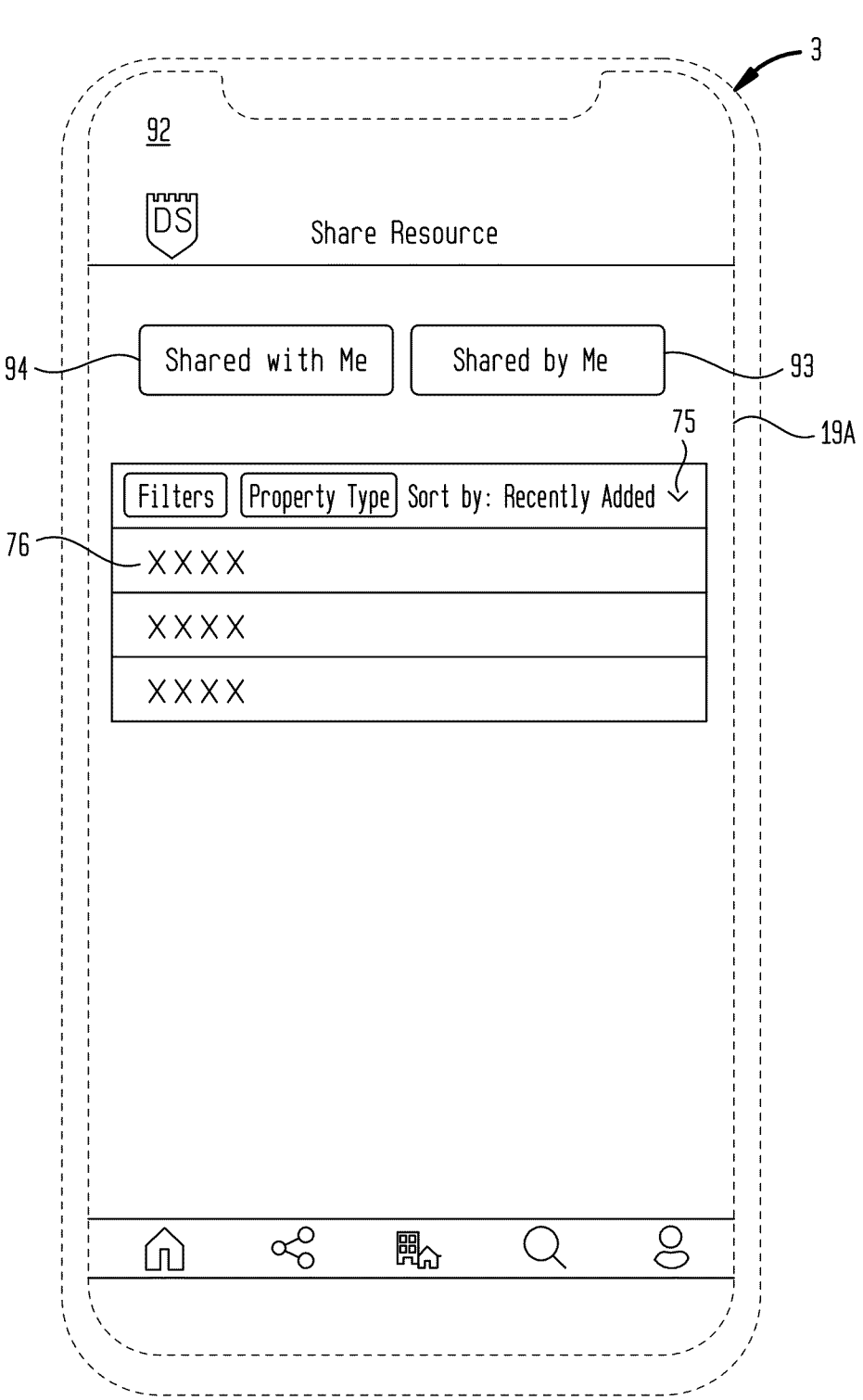
FIG. 23 illustrates a user interface depicting an embodiment of a shared resource menu.
Figure 24:
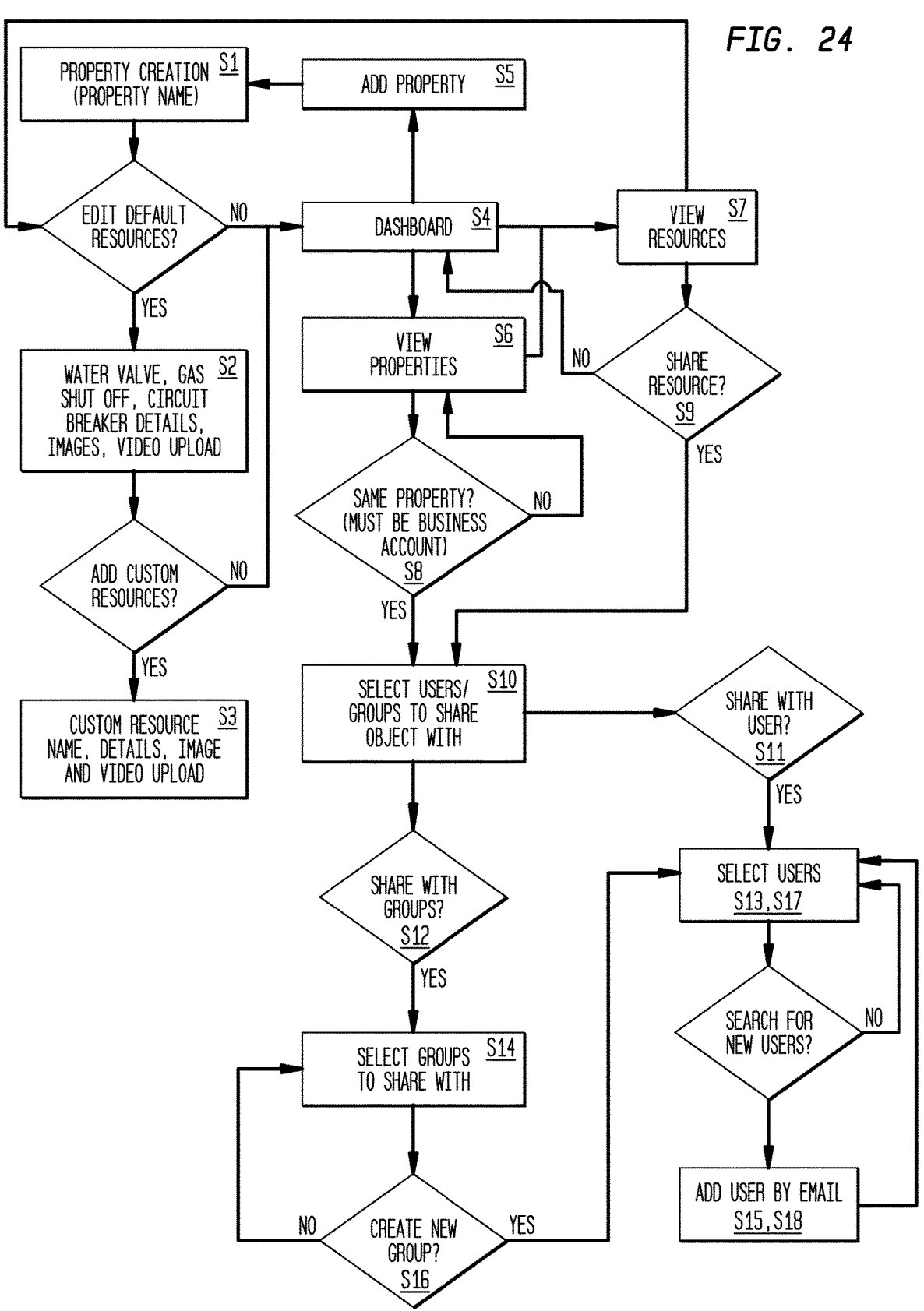
FIG. 24 is a block flow diagram illustrating a method of using an embodiment of the property and property resource information sharing user interface on a computing device or in a system.

Resource Share. Now, with primary reference to FIG. 15, in particular embodiments, selection of a property identifier (39) by user indications (22) in the homepage menu (60) can activate the resource module (41) to depict resource identifiers list (63) including the resource identifiers (44) of resources (17) associated with the selected property identifier (39) of a property (16) in the user account (26) (the example of FIG. 15 depicts resource identifiers "Water Valve", "Gas Shut Off" and "Circuit Breaker Box"), as above described. Now, with primary reference to FIG. 20, selection of a resource identifier (44) in the homepage menu (60) by user indications (22) can activate the share module (70) to depict a resource share menu (84) including a share dialog box (73). In particular embodiments, the resource share menu (84) can depict the share with user dialog box (73) (in the example of FIG. 20 "Share With User") or depict the share with group dialog box (74) (in the example of FIG. 20 "Share With Group"), or depict both. Now, with primary reference to FIGS. 20 and 21, by first user indications (22) in the share with user dialog box (73), the share module (60) can function to depict a user identifiers list (75) including a plurality of user identifiers (76) selectable by user indications (22) of the user (14) (as shown in the example of FIG. 21). The user (14) by selection of a user identifier (76) can by user indications (22) in a share icon (78) associate the resource metadata (13") corresponding to the selected property identifier (39) with the user identifier (76) in the system (1). Similarly, by user indications (22) in the share with group dialog box (74), the share module (70) can function to depict the user identifier list (75) including the plurality of user identifiers (76) each user identifier (76) selectable by user indications (22) to associate group user identifiers (77) with the resource metadata (13") associated with the selected property identifier (39) in the system (1). The user (14) can by user indications (22) in a share icon (78) authorize retrieval of the property metadata (13') associated with the selected property identifier (39) by the users (14) associated with the selected user identifier (76) or group user identifiers (77).

Shared Properties. Now, with primary reference to FIGS. 15 and 22, the homepage menu (60) can depict a property share icon (85) which by user indications (22) can activate the share module (70) to depict a shared property menu (86). Now, with primary reference to FIG. 22, the user (14) can by user indications (22) in a property shared by user dialog box (87) (in the example of FIG. 22 "Shared By Me") can cause the share module (70) to depict a user identifier list (75) including user identifiers (76) associated with the property metadata (13') of a selected property identifier (39) shared by user (14). Similarly, the user (14) can by user indications (22) in a property shared with user dialog box (89) (in the example of FIG. 22 "Shared With Me") can cause the share module (70) to depict a property shared with user menu (90) depicting user identifier list (75) including user identifiers (76) associated with property metadata (13') share with and retrievable for viewing by the user (14).

Shared Resources. Now, with primary reference to FIGS. 15 and 23, in particular embodiments, the homepage menu (60) can depict a resources shared dialog box (71) which by user indications (22) can activate the share module (70) to depict a shared resources menu (92). Now, with primary reference to FIG. 23, the user (14) can by user indications (22) in a resources shared by user dialog box (93) (in the example of FIG. 23 "Shared By Me") can cause the share module (70) to depict a user identifier list (75) of user identifiers (76) associated with user contact information (81) with which the user (14) has shared resource metadata (13"). Similarly, the user (14) can by user indications (22) in a resource shared with user dialog box (94) in the shared resources menu (92) (in the example of FIG. 22 "Shared With Me") can cause the share module (70) to depict a user identifier list (75) of user identifiers (76) associated with user contact information (81) of the users (14B) that have shared resource metadata (13") with the user (14).

As can be easily understood from the foregoing, the basic concepts of the present invention may be embodied in a variety of ways. The invention involves numerous and varied embodiments of a property resource location and information sharing system and methods for making and using such property resource location and information sharing system including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "server" should be understood to encompass disclosure of the act of "serving"—whether explicitly discussed or not—and, conversely, were there is a disclosure of the act of "serving", such a disclosure can be understood to encompass disclosure of a "server" and even a "means for serving". Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Further, for the purposes of the present invention, the term "coupled" or derivatives thereof can mean indirectly coupled, coupled, directly coupled, connected, directly connected, or integrated with, depending upon the embodiment.

Additionally, for the purposes of the present invention, the term "integrated" when referring to two or more components means that the components (i) can be united to provide a one-piece construct, a monolithic construct, or a unified whole, or (ii) can be formed as a one-piece construct, a monolithic construct, or a unified whole. Said another way, the components can be integrally formed, meaning connected together so as to make up a single complete piece or unit, or so as to work together as a single complete piece or unit, and so as to be incapable of being easily dismantled without destroying the integrity of the piece or unit.

Thus, the applicant(s) should be understood to claim at least: i) each of the property resource location and information systems herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application, if any, provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon. The elements following an open transitional phrase such as "comprising" may in the alternative be claimed with a closed transitional phrase such as "consisting essentially of" or "consisting of" whether or not explicitly indicated the description portion of the specification.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

I claim:

1. A computer implemented system, comprising:
   a server including a non-transitory computer readable medium containing a program executable to:
   receive by user indications in a graphical user interface a property identifier of a physical structure;
   receive by user indications in a geographic representation depicted in said graphical user interface a property location of said physical structure;

associate said property location with said property identifier;

receive by user indications in said graphical user interface a resource identifier of a physical resource, wherein said physical resource being a physical element having a location inside of said physical structure;

receive by user indications in said graphical user interface a resource location of said physical resource inside of said physical structure with said resource identifier; and associate said resource identifier of said physical resource inside of said physical structure with said property identifier.

2. The system of claim 1, wherein said program further executable to receive by user indications in said graphical user interface property metadata associated with said physical structure.

3. The system of claim 2, wherein said program further executable to receive by user indications in said graphical user interface resource metadata associated with said physical resource.

4. The system of claim 3, wherein said resource identifier associated with said resource metadata retrievably stored in said server or in a database accessible by said server.

5. The system of claim 4, wherein said resource metadata includes one or more of: a text documents, a still or moving image, a video clip, an audio clip, location coordinates, global positioning coordinates, and combinations thereof.

6. The system of claim 5, wherein said physical resource located in said physical structure comprises one or more of: a water shut off valve, a gas shut off valve, and a circuit breaker box.

7. The system of claim 2, wherein said property identifier associated with said property metadata retrievably stored in said server or in a database accessible by said server.

8. The system of claim 2, wherein said property metadata includes one or more of: a text documents, a still or moving image, a video clip, an audio clip, location coordinates, global positioning coordinates, and combinations thereof.

9. The system of claim 1, wherein said program further executable to receive by user indications of a first user in said graphical user interface one or more second user identifiers correspondingly associated with one or more second users, said one or more second user identifiers retrievably stored in said server or a database.

10. The system of claim 9, wherein said program further executable by said user indications of said first user in said graphical user interface to depict in said graphical user interface a property identifiers list of property identifiers stored in said server or said database.

11. The system of claim 10, wherein said program further executable to receive selection by said user indications of said first user of one of said property identifiers in said list of property identifiers.

12. The system of claim 11, wherein said program further executable by user indications of said first user in said graphical user interface to depict in said graphical user interface a second user identifier list of said one more second user identifiers stored in said server or said database.

13. The system of claim 12, wherein said program further executable by user indications of said first user in said graphical user interface to select said one or more second user identifiers stored in said server or said database.

14. The system of claim 13, wherein said program further executable to associate said property identifier selected by said first user with said one or more second user identifiers selected by said first user from said second user identifier list.

15. The system of claim 13, wherein said program further executable by user indications of said first user in said graphical user interface to allow retrieval of said property metadata associated with said property identifier selected by said first user upon request by said one or more second users associated with said one or more second user identifiers.

16. The system of claim 15, wherein retrieval of said property metadata includes retrieval of said resource metadata associated with resource identifier associated with said property identifier.

17. The system of claim 13, wherein said program further executable to associate said resource identifier selected by said first user with said second user identifier selected by said first user.

18. The system of claim 13, wherein said program further executable by user indications of said first user in said graphical user interface to allow retrieval of said resource metadata associated with said resource identifier selected by said first user upon a second user request associated with said second user identifier.

19. The system of claim 11, wherein said program further executable by said user indications of said first user in said graphical user interface to depict in said graphical user interface a resource identifiers list of resource identifiers stored in said server or said database.

20. The system of claim 19, wherein said program further executable to receive selection by said first user of one of said resource identifiers in said list of resource identifiers.

21. The system of claim 20, wherein said program further executable by user indications of said first user in said graphical user interface to depict in said graphical user interface a second user identifier list of second users stored in said server or said database.

22. The system of claim 21, wherein said program further executable by user indications of said first user in said graphical user interface to select said one or more second users stored in said server or said database.

* * * * *